(12) United States Patent
Salloum

(10) Patent No.: US 11,250,725 B1
(45) Date of Patent: *Feb. 15, 2022

(54) ARITHMETIC EDUCATIONAL TOOL

(71) Applicant: Thanaa Salloum, Phoenix, AZ (US)

(72) Inventor: Thanaa Salloum, Phoenix, AZ (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/720,305

(22) Filed: Dec. 19, 2019

Related U.S. Application Data

(63) Continuation-in-part of application No. 15/984,325, filed on May 19, 2018, now Pat. No. 10,546,513, which is a continuation-in-part of application No. 14/961,690, filed on Dec. 7, 2015, now Pat. No. 10,062,299.

(60) Provisional application No. 62/508,869, filed on May 19, 2017.

(51) Int. Cl.
*G09B 19/02* (2006.01)
*G09B 1/02* (2006.01)
*G09B 23/02* (2006.01)

(52) U.S. Cl.
CPC .............. *G09B 19/02* (2013.01); *G09B 1/02* (2013.01); *G09B 23/02* (2013.01)

(58) Field of Classification Search
None
See application file for complete search history.

(56) References Cited

U.S. PATENT DOCUMENTS

| | | | |
|---|---|---|---|
| 3,793,470 A | | 2/1974 | Christy et al. |
| 3,864,850 A | * | 2/1975 | Helmecke ............ G09B 19/02 434/207 |
| 4,006,344 A | * | 2/1977 | Schutte ................. G06C 1/00 235/68 |
| 4,553,944 A | * | 11/1985 | Flanagan ............ G09B 19/02 434/191 |
| 5,529,497 A | * | 6/1996 | Bigold .................. G09B 1/02 434/191 |
| 5,876,212 A | | 3/1999 | Hartung |
| 5,989,035 A | * | 11/1999 | Okoye ................. G09B 19/02 206/315.1 |
| 7,695,283 B2 | | 4/2010 | Buhrman |
| (Continued) | | | |

OTHER PUBLICATIONS

Vinco Educational product catalog 2019; Betzold Group, Vinco Education GmBH, Ferdinand-Porsch-Str. 6, 73479 Ellwangen, Germany, pp. 67 to 74.

*Primary Examiner* — Sunit Pandya

(57) ABSTRACT

The arithmetic educational tool utilizes a container having a main chamber and two extended chambers from the main chamber to visually demonstrate addition and subtraction. Objects placed with the container will move from the main chamber into the extended chambers to break the number objects in the main chamber into parts. The container is bifurcated, having the two extended chambers branching off of from the main chamber in a bifurcated portion. A count-control wheel having blocking and receiving sections enables a user to control the movement of the objects between the chambers. The count-control wheel may receive an object in the receiving section and then be turned to move the retained object into one of the other chambers. One or more of the chambers may have an obscuring feature, such as a color or slidably cover, that enables obscuring the number of objects therein.

20 Claims, 20 Drawing Sheets

(56) References Cited

U.S. PATENT DOCUMENTS

| | | | |
|---|---|---|---|
| 9,542,857 B2 * | 1/2017 | Ito | G09B 19/02 |
| 2011/0311953 A1 | 12/2011 | Goll | |

* cited by examiner

ARITHMETIC EDUCATIONAL TOOL

CROSS REFERENCE TO RELATED APPLICATIONS

This application is a continuation in part of U.S. patent application Ser. No. 15/984,325, filed on May 19, 2018 and currently pending, which is a continuation in part of U.S. patent application Ser. No. 14/961,890, filed on Dec. 7, 2015 and issued as U.S. Pat. No. 10,062,299 on Aug. 28, 2018, and application Ser. No. 15/984,325 also claims the benefit of priority to U.S. provisional patent application No. 62/508,869, filed on May 19, 2017; the entirety of all applications listed above hereby incorporated by reference herein.

BACKGROUND OF THE INVENTION

Field of the Invention

The invention relates to a tool for facilitating arithmetic education through visual demonstration.

Background

It is well, known that people have different learning proficiencies through different educational means or styles. Some people can effectively learn through bookwork, while others learn best through lectures or audible communication, and many people learn best through, visual education. Mathematics and particularly arithmetic is taught at an early age through workbooks. These workbooks may have drawings of objects that are added together but this is only two-dimensional and some students may not appreciate or effectively learn through this method. There is a need for an educational tool that can be used to facilitated arithmetic education.

SUMMARY OF THE INVENTION

The invention is directed to an arithmetic educational tool that comprises a bifurcated container having a main chamber and two extended chambers for receiving objects that can move from the main chamber to the two extended chambers, or from the two extended chambers to the main chamber. The movement of the objects within the container can be used to visually demonstrate addition and subtraction or composition, decomposition. The arithmetic educational tool is well suited for teaching addition/subtraction in the lower grades, such as kindergarten through third grade and for special needs students.

The movement of objects from the main chamber to the two extended chambers, and vice versa can effectively visually demonstrate the decomposition and composition of a number. For example, when adding two numbers, two groups of objects are placed in the first and second chambers, such as two objects in the first chamber and three objects in the second chamber. The container is then tilted so the first, and second chambers are elevated with respect to the main chamber. The objects then move from the first and second chambers to the main chamber where they can be counted and thereby educate a student to the addition of the objects from the first and second chambers, or composition of two numbers. The following example would illustrate the equation (2+3=5). A chamber may have a transparent side and an opaque side and may be configured to rotate to expose the objects within the chamber, thereby providing the student an opportunity to guess the correct answer before the actual number of objects is exposed. For example, three objects may be placed in the first chamber and five objects in the second chamber. A teacher may rotate the main chamber to hide the number of objects that collect in the main chamber when the container is tilted with the main chamber in a down position. The teacher may ask the student how many objects are in the main chamber before rotating the main chamber to expose the actual number of objects therein. This illustrates the equation, (3+5=?). A student, may be asked to solve this equation by answering how many objects are in the main chamber before it is exposed. A chamber may comprise a slidable cover that enables obscuring and exposing the contents of a chamber. A slidable cover and a collar that enables rotation of the chambers are examples of obscuring features.

The exemplary arithmetic educational tool of the present invention may be used for fact families, wherein the integers that can be, added to result in a sum of a number are determined. For example, for number five, the following combination of integers make up the fact family: 0 and 5, 1 and 4 and 2 and 3. In addition, the exemplary arithmetic educational tool may be used in the education of base values, wherein one of more of the objects is a color or has some designation to represent base 10, or base 100. For example, three red balls may each represent a value of 10 and 7 white balls may each represent a value of 1. The combined balls add to 37 and by turning the arithmetic educational tool, the balls will divide and the student is challenged to determine value. Addition and subtraction of base values can be taught in this way.

An exemplary arithmetic educational tool may be used to demonstrate subtraction or decomposition of a number into two smaller numbers. For example, seven objects may be placed the main chamber and counted while the main chamber is in down orientation with respect to the two extended chambers. One of the extended chambers may be rotated to obscure the object collected therein. The container may then be oriented with the main chamber in an up position to the first and second chambers, thereby causing the objects to move from the main chamber into the two extended chambers. The student may then count the number of objects in the extended chamber that is exposed, or has the transparent portion facing the student. For example, three of the objects may move into the first exposed chamber and four may move into the second obscured chamber. The teacher may ask the student how many objects are in the second chamber before rotating the second chamber to expose the number of objects therein. The student is challenged with the equation (7−3=?). The arithmetic educational tool thereby illustrates the equation (7−3=4). Again, for the purposes of illustrating the concept of subtraction, one of the extended chambers may be covered, by a slidable cover, thereby requiring the student to determine how many objects are in the covered container by subtracting the number in the extended chamber that is not covered. For example, the first chamber may be covered by a slidable cover, thereby leaving four objects in the second chamber to be subtracted from the number of objects in the main chamber, as expressed in the equation, 7−4=3. The movement of the objects from the main chamber to the two extended chambers may be random and thereby provide any number of decomposition examples of, a number of objects within the main chamber.

An exemplary arithmetic educational tool comprises a bifurcated container having a main chamber and two extended chambers, for receiving objects that can move from the main chamber to the two extended chambers or from the two extended chambers to the main chamber. The container, or at least a portion of the chambers of the container, may be, made out of a translucent or transparent material to allow counting of the objects through the exterior wall. The interior volume of the container is contiguous, enabling the objects to move feely therein. The main chamber may have a base that is planar to allow the bifurcated container to be self-standing on the main chamber base, wherein the two extended chambers are elevated from the main chamber base. The two extended chambers may also have planar bases and they may be aligned and parallel with each other to allow the container to be self-standing on the two extended chamber bases. The main chamber and two extended chamber bases may be parallel with each other, creating a planar first and second end of the container that is perpendicular to a length axis.

In an exemplary embodiment, the bifurcated container comprises an insertion aperture in the exterior wall to enable objects to be placed therein. An insertion aperture may be just larger than the outer dimension of an object, or diameter, to allow the objects to be placed into the container and to prevent them from inadvertently coming out of the insertion aperture. An insertion aperture may be configured in a main chamber, one or more of the first and second chambers, in a connection portion, a bifurcated portion, a base, and the like. In a preferred embodiment, an insertion aperture is configured in each of the chambers to enable a student to count the objects as they are placed therein. The insertion aperture may be configured above the height where the objects would collect or stack within a chamber when that chamber is in down position.

In an exemplary embodiment, the bifurcated container comprises a cap that is configured over a base aperture to allow the quick removal of the objects from the container. A cap may be configured over the main chamber only, or on one or both of the extended chamber bases. In an exemplary embodiment, the bifurcated container comprises a cap on each of the chamber bases. A cap may be any suitable type of cap for closing a base aperture and may be a lid that extends around the base of the chamber, a cap having threads that mate with threads on the container, a plug, a sliding cap or closure feature, a door that opens and may be hinged to the container, and the like. A screw cap may be preferred as it will resist popping off if the objects impact the cap as they drop into a chamber. One or more of the chambers may have a door that opens, such as by a hinge to allow the object to be easily inserted and removed. In a preferred embodiment, a door with a hinge coupled to the container is configured on the main chamber. An exemplary bifurcated container comprises an insertion aperture with an insertion cover that can be actuated to allow insertion or removal of object from the container, such as one or more of the chambers. An insertion cover may be configured to flip open and comprise a hinge or may be configured to slide or rotate to expose the insertion aperture. A sliding insertion cover may be coupled with a pin that secures the insertion cover to the container but enables it to rotate about the pin to allow exposure of the insertion aperture. An insertion cover may be configured along an outer perimeter of a chamber and may be curved to match the contour of the chamber wall; thereby enabling the insertion cover to slide to expose an insertion aperture.

The chambers may be configured with indentations in the base to allow the objects to rest in a still position to allow easier counting, as the objects will be prevented from moving. For example, the objects may be balls, or spherical in shape and the indentations may be concave areas in the interior surface of the chamber base and the balls may come to rest in the concave indentations. In another embodiment, the interior base surface of a chamber is sloped toward a front of the bifurcated container to cause the objects to rest against the front wall of the chamber to facilitate counting. In still another embodiment, the diameter or depth of the interior of the chamber is just larger than the diameter or cross-dimension of the object which keeps the objects in a planar arrangement with respect to each other within the container and will therefore stack on each other to facilitate counting.

The first and second chamber may extend from a bifurcated portion of the container and extend in afferent directions, whereby the two chambers are separated from each other by an offset distance. In another embodiment, the first and second chamber may extend or branch from the main chamber directly and a deflector may be configured within the interior of the main chamber to divert objects into the first and second chambers.

An exemplary bifurcated container may comprise one or more rotating collars that enable a chamber to rotate from an orientation where the front and transparent side is exposed to a user, to an orientation where the back and obscured or opaque side is exposed to the user. As described herein, this rotational feature enables the teacher to illustrate equations and challenge the student with calculating an answer before exposing the number of objects within the chamber. A collar may simply be the overlap of a chamber with a bifurcated portion of the container or connecting portion of the container. In an exemplary embodiment, a connecting portion is a separate part having three openings and a raised perimeter around the openings for coupling to the chambers and for creating the rotating collar attachment to the chambers. For example, a chamber opening, for receiving objects from the other chambers, may extend around an enlarged end of a connecting portion and thereby retain the chamber to the connecting portion and enable the connection portion to rotate. An obscuring feature may comprise a slidable cover. A chamber may comprise a slidable cover can be slid over a portion of the chamber to hide or conceal how many objects are therein. A slidable cover may be coupled with the exterior wall of the chamber and have a raised handle or tab to move the slidable cover.

An exemplary bifurcated container nay comprise one or more count-control features, such as an aperture configured near the bifurcated portion to allow a user to control the number of objects that move into the extended chambers from the main chamber. An exemplary count-control feature may be a count-aperture through the exterior wall of the bifurcated container proximal the bifurcation in the container to allow a user to prevent an object from moving from the main chamber into one of the extended chambers. This enables a user, or teacher, to produce an outcome in the extended chambers as desired. For example, five balls may be, placed into the main chamber and then the container may be oriented to cause the balls to roll from the main chamber down into the extended chambers and the teacher may use a finger to allow one ball to roll into the first chamber and block the remaining four balls from the first chamber, thereby causing the remaining four balls to move into the second chamber. The outcome will therefore be one ball in the first chamber and four balls in the second chamber. The second chamber may comprise an opaque portion that prevents the student from seeing the four balls in the second chamber until it is rotated. This may allow a teacher to create an outcome for the purposes of challenging the student with a particular summation quantity. An exemplary count-aperture may be smaller in dimension, such as diameter, than the object dimensions, or diameter, to prevent the objects from falling out of the container through the count-control aperture. An exemplary count-aperture may be configured just above or partially above an opening to one or both of the extended first and second chambers to allow blocking of the objects into one of the extended chambers and deflecting these objects to the other extended chamber.

In an exemplary embodiment a count-control feature is an opening over the bifurcated portion that is centered between the first and second chambers and may extend at least partially over the openings to the first and second chambers. A single count-control feature may allow deflecting of objects into the desired first or second chamber as the objects fall from the main chamber. A user may simply use their finger to control the object into the desired chamber. An exemplary count-control feature may comprise a plunger that extends into the interior of the container and a user may push the plunger in or pull it out to control the number of objects that move into one of the extended chambers. A plunger may be configured with a plunger spring to keep the plunger in or out thereby requiring the user to overcome the plunger spring force to change the orientation. For example, a plunger spring may be configured between the outside surface of the container and user interface and the plunger spring may keep the plunger pulled up against the interior wall of the container to prevent it from interfering with the objects. A user may have to push on the user interface, a button, for example, to compress the plunger spring and force the plunger into the interior of the chamber where it will interfere with and block objects from passing. An exemplary count-control feature may be configured on either side of the bifurcation, just above the opening to one or both of the extended chambers, or extend in a band centered between the first and second chambers.

An exemplary count-control feature is a count-control wheel configured between the main chamber and the first and second chambers. An exemplary count-control wheel has a receiving section of the wheel to allow objects from the chambers to enter into the receiving section when the receiving section is aligned with a conduit of one of the chambers. The objects, such as balls, may roll into the receiving section and then the count-control wheel may be spun to align the receiving section, containing one or more of the balls, with one of the other chambers, or conduits to said chamber, to move the objects from a first chamber to a second chamber. An exemplary count-control wheel has a blocking section that prevents objects from entering therein from the chamber conduits. A count-control feature may be coupled to the bifurcated container in the bifurcated portion and may be coupled by a home spring that returns the count-control feature to a home position. A return spring may enable the count-control feature to be pulled out from the container to enable the objects to move through the bifurcated portion unobstructed. A teacher may pull the count-control feature out to return all the objects quickly back to a main chamber after demonstrating a math concept. This pull out feature may be enabled by a return spring that extends around a retainer that extends through between the container and into a retainer coupler, such as threads, of the count-control wheel. A home spring and return spring may be a single spring or two separate springs. A spring element or spring, as used herein, may be a coiled spring or an electromeric material that can be deformed from an original configuration or dimension by a load and that then returns substantially to said original configuration or dimension upon removal of the load.

An exemplary bifurcated container may comprise protrusions extending into the interior of the container to deflect the objects. For example, a plurality of protrusions may extend inward along the connecting portion or bifurcated portion to deflect the objects as they fall from the main chamber down towards the first and second chambers. The protrusions may be configured on alternating sides of the conduit to make the objects bounce back and forth which may be entertaining to children and may slow the objects down to allow the user more time to control which chamber they move into using the count-control feature. A protrusion may be in a spiral shape whereby the objects are forced to spiral along the interior of the conduit from the main chamber to the first and second chambers.

An exemplary bifurcated container may comprise a landing nest or area in the bifurcated portion between the first and second, chambers that objects will hit as they fall down toward the first and second chambers from the main chamber. In some cases, the objects will land on or in the landing nest to allow a user to control which chamber the object goes into. An exemplary landing nest, extends or transverses orthogonally to the length axis of the bifurcated container. Put another way, the landing nest extends a width between the first and second chambers wherein the plane of the landing nest or width direction is opposite the main chamber or configured orthogonally to, a connecting chamber length. Orthogonally as used herein means substantially orthogonally, or within about 20 degrees of being orthogonal and preferably within about 10 degrees. An exemplary landing nest has a width that may be a portion of the dimension of the objects, such as the diameter of the objects, and may be about 50% of the diameter of the objects or more, about the same as the diameter of the objects, about 150% of the diameter of the objects or more or about two times the diameter of the objects or less. The width of the landing nest may be selected to enable better control of the direction of the objects. An exemplary landing nest is concave in shape along the interior surface to better secure a spherical object therein. The count-control feature may be configured over this landing nest to allow the user to use their finger or thumb to deflect the objects to one side or the other. This landing, nest in combination with protrusions along the interior may prevent the objects from falling too quickly and may aid in control and accuracy of the count desired in each chamber.

A chamber may be any suitable shape and be large enough to accommodate a plurality of objects within the interior volume. In one embodiment, a chamber is cylindrical in shape and may have a diameter that is large enough to accommodate a single object, but not large enough to accommodate two objects side by side along the length of the cylinder. A chamber may be circular in shape at the base of the chamber and truncate in diameter as it extends to the bifurcated portion, as defined herein as a flask shape. A chamber may have a depth that is large enough to accommodate a single object within the depth, but not large enough to accommodate two objects within the depth dimension, thereby causing the objects to stack within the chamber for easy counting. In one embodiment, the chambers are square or rectangular in cross-sectional shape and again, have a depth that accommodates a single object.

The arithmetic tool of the present invention may be sized to allow effective one-on-one education or sized to allow a teacher to teach a small group or even entire classroom. For individual teaching, the length of the container may be about 15 cm or more, about 25 cm or more or about 40 cm or more. For teaching a small group, the length of the container may be about 25 cm or more or about 50 cm or more. For teaching an entire classroom, the length of the container may be about 50 cm or more, about 75 cm or more or about 1 m or more. A container may have any length between and including the length values provided. It is to be understood that the diameter or cross-dimension of the objects may be scaled according to the size of the container, wherein the smaller sized containers may have objects having a diameter of about 10 mm or more and wherein the larger containers may have object having a diameter of about 25 mm to about 50 mm or greater. The diameter of the chambers may be sized to accommodate any number of objects, such as ten, fifteen, or twenty or more.

The objects may be any suitable objects that can move freely within the interior volume of the container and are preferably balls or spheres, such as marbles, for example. The objects may be different colors to represent base ten numbers and any number of objects may be part of the arithmetic educational tool including, but not limited to eight, ten, fifteen, twenty or more and the like. It is preferred that the arithmetic educational tool comprise and accommodate at least ten objects to enable education of addition/subtraction of numbers within the range of ten or more. The objects may be any suitable size including, but not limited to about 10 mm, about 20 mm, about 40 mm or about 50 mm in diameter and any range between and including the diameter values provided. An object may be sized slightly smaller than the diameter of an insertion aperture diameter, such as being about 90% of the insertion aperture diameter or larger or about 80% of the insertion aperture diameter or larger. When the diameter of the object is about the same size as the insertion aperture it reduces the likelihood that the objects will fall out of the insertion aperture during use.

An exemplary arithmetic tool may comprise a magnetic component to enable the tool to be coupled to a metallic object, such as a chalk board. A magnetic component, such as a permanent magnet may be configured on one or more of the chambers or preferably on the bifurcated portion. An educator may challenge the students with a particular arithmetic question utilizing the tool and then place it on the board to show the answer. The arithmetic tool may be positioned away from the object it is coupled to such that one of the chambers can be rotated to reveal the answer to the students.

An exemplary arithmetic tool may have chambers that are disc shaped having two parallel and planar sides and a circular outer perimeter. The distance between the parallel sides may be larger than a single object but not large enough for two objects to extend across the depth between the two sides. This configuration will force the objects, or balls, to stack within the chambers and therefor make them easier to see and count.

An exemplary arithmetic tool may be configured in an enclosure and the enclosure may spin to allow the objects therein to move from one chamber to another. The enclosure may be mounted to enable the enclosure to spin and the enclosure may have handles to allow a user to freely spin and stop the chamber in different orientations. The exemplary arithmetic tool may be adapted for use on a playground, wherein children can spin the enclosure and then count the number of balls in each of the chambers. This may be useful in educating fact families. A teacher may change the number of balls in the exemplary arithmetic tool each day or week, for example, so children learn the fact families for a variety of numbers.

The summary of the invention is provided as a general introduction to some of the embodiments of the invention and is not intended to be limiting. Additional example embodiments including variations and alternative configurations of the invention are provided herein.

BRIEF DESCRIPTION OF THE DRAWINGS

The accompanying drawings are included to provide a further understanding of the invention and, are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
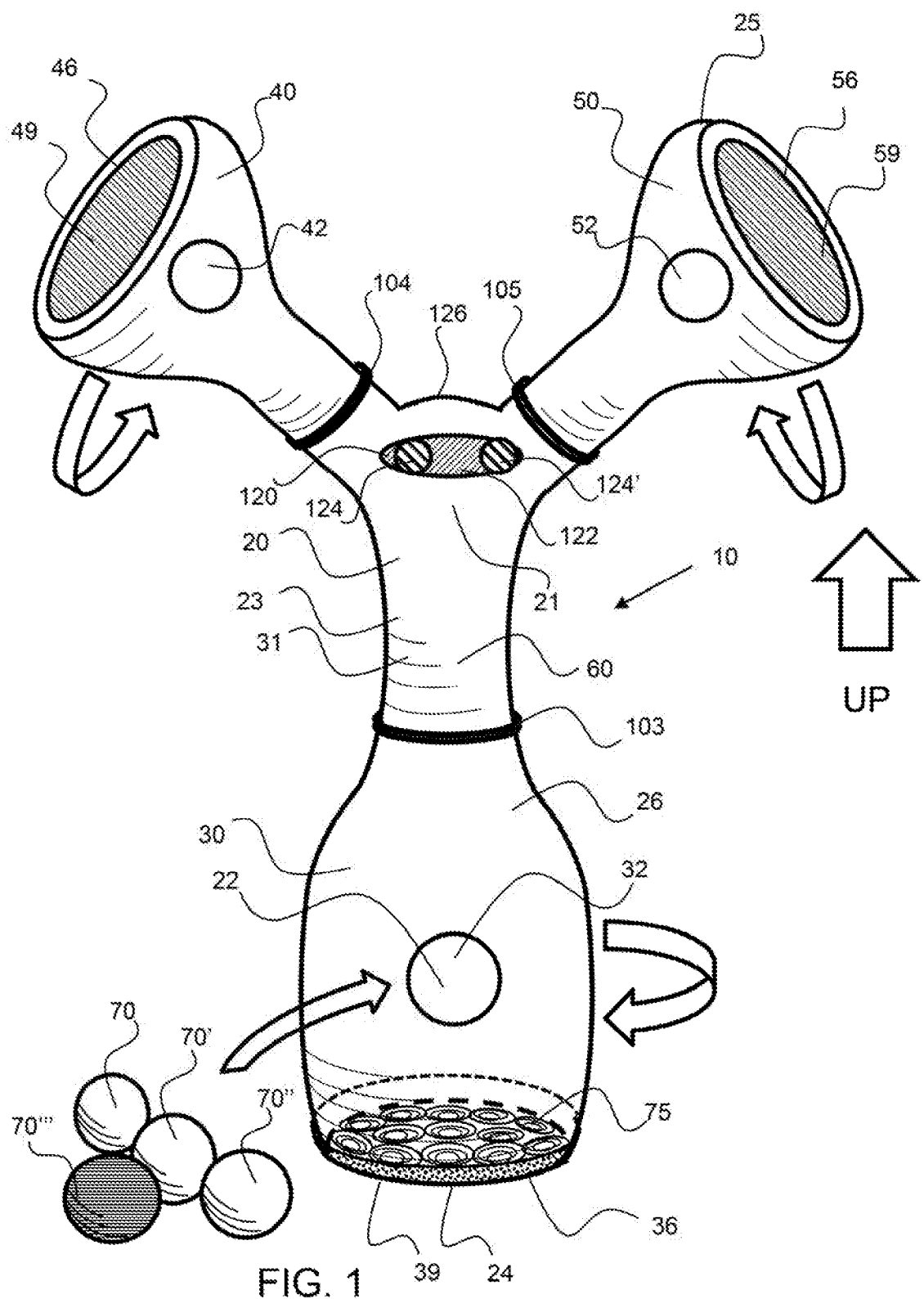

FIG. 1 shows an exemplary arithmetic educational tool having a main chamber and two extended chambers, wherein the main chamber is in a declined configuration with respect to the two extended chambers.

Figure 2:
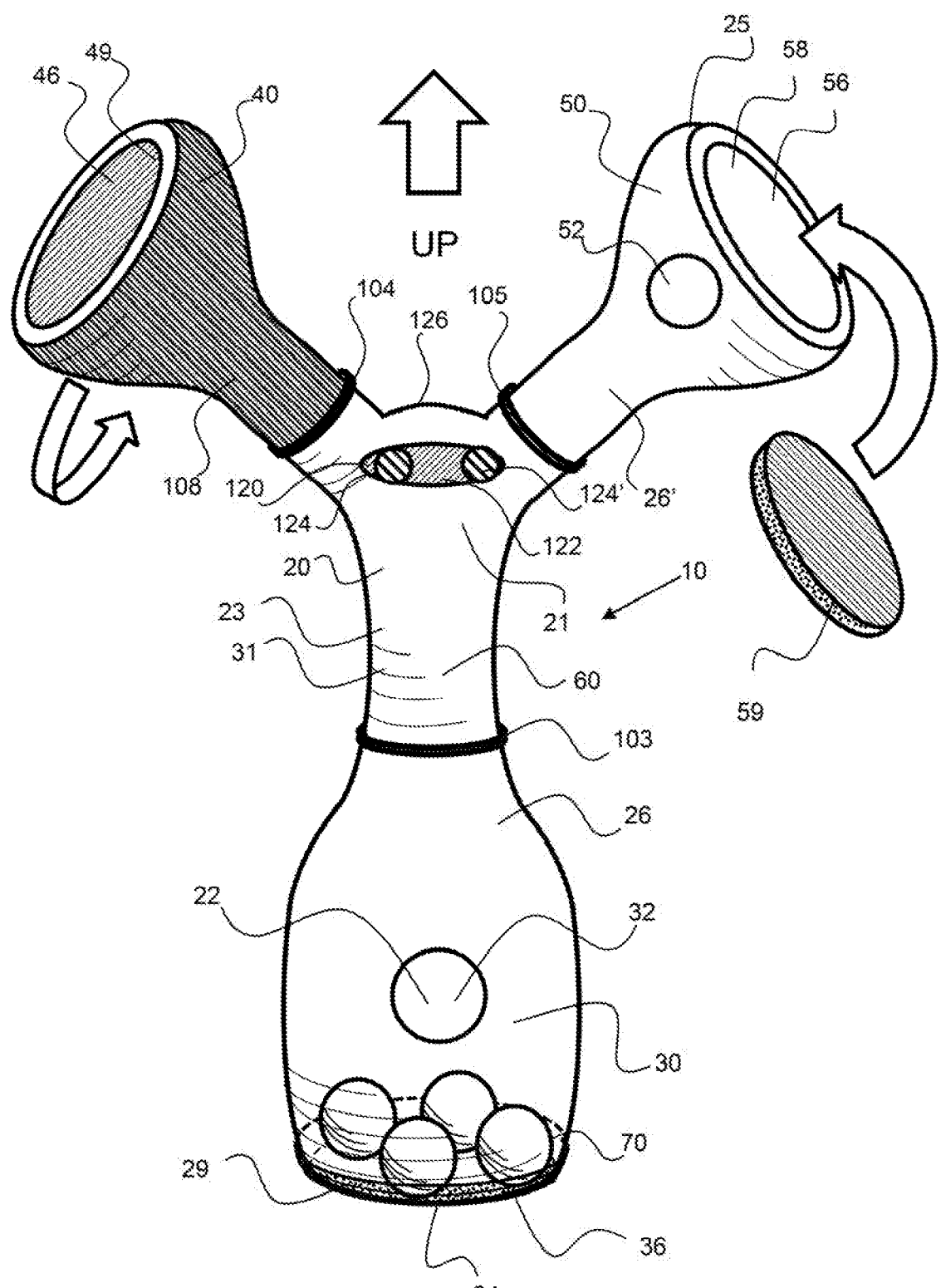

FIG. 2 shows the exemplary arithmetic educational tool shown in FIG. 1 with the four objects placed within the interior volume of the main chamber and the cap of one of the extended chambers removed.

Figure 3:
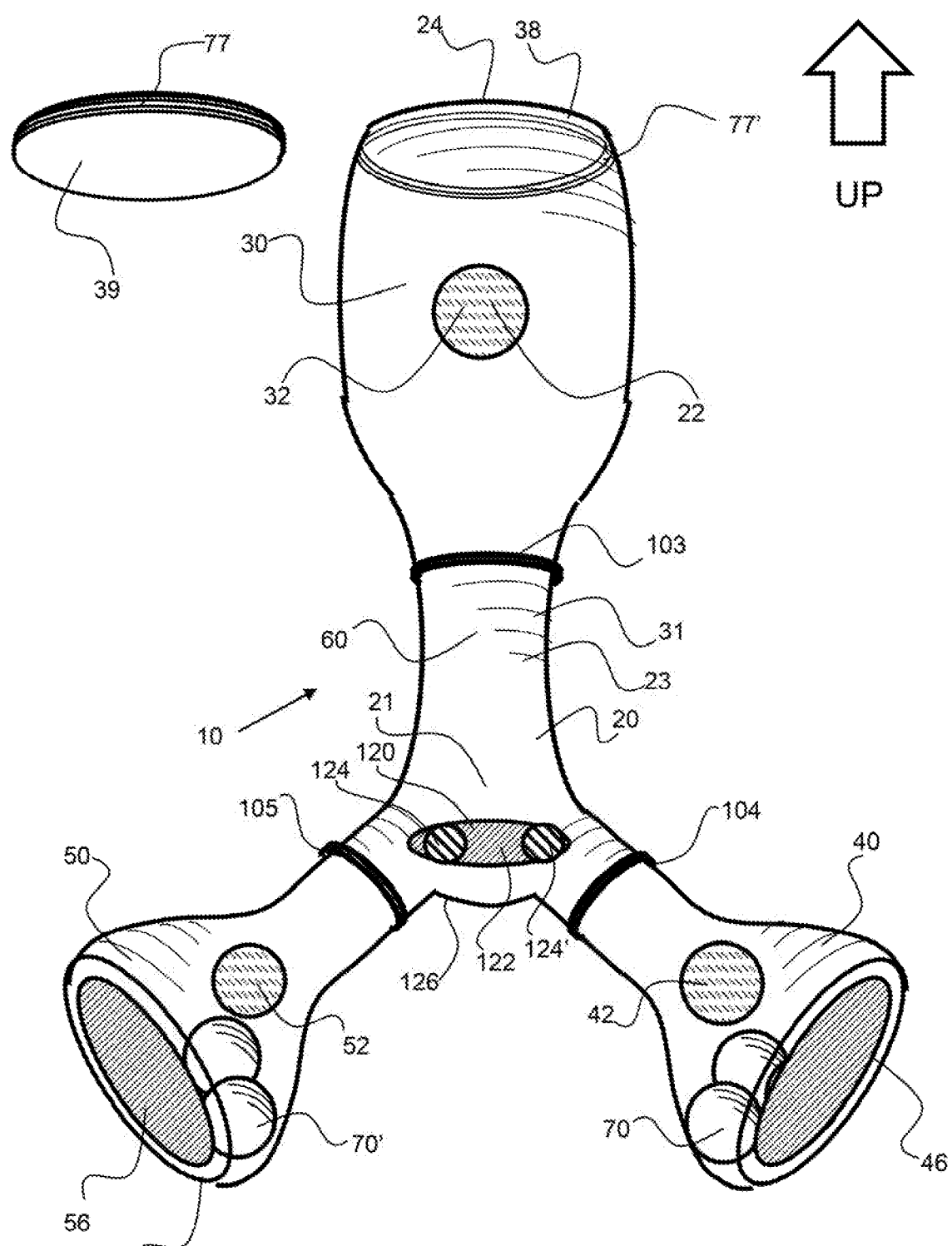

FIG. 3 shows the exemplary arithmetic educational tool shown in FIG. 2 with the main chamber in an elevated or up configuration with respect to the two extended chambers and the four objects retained in the two extended chambers.

Figure 4:
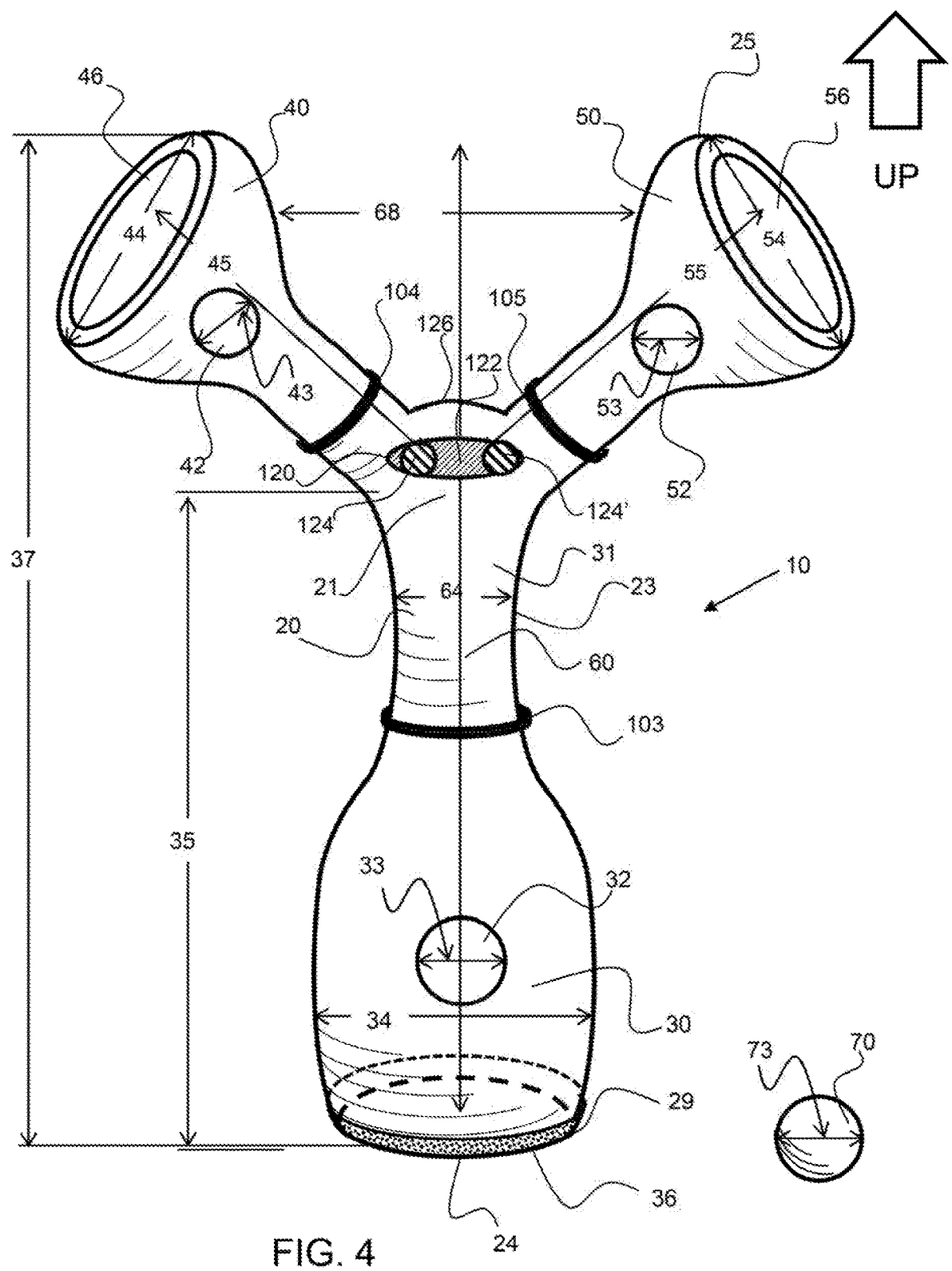

FIG. 4 shows an exemplary arithmetic educational tool having a main chamber, a first chamber and a second chamber that are extended from the main chamber and a bifurcated portion.

Figure 5:
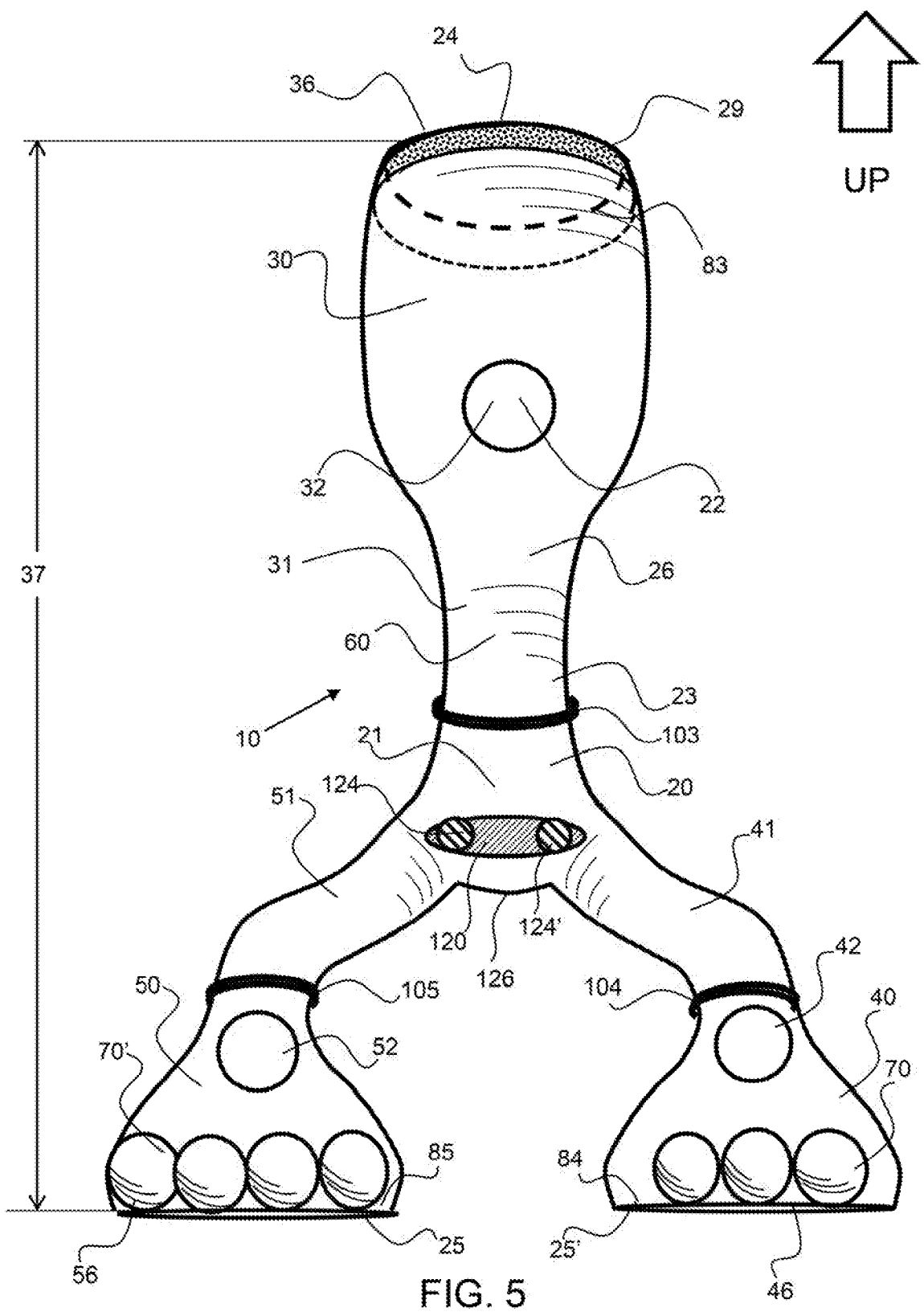

FIG. 5 shows an exemplary arithmetic educational tool comprising a bifurcated container that is resting on the base of the two extended chambers, wherein there are seven objects contained within the two extended chambers.

Figure 6:
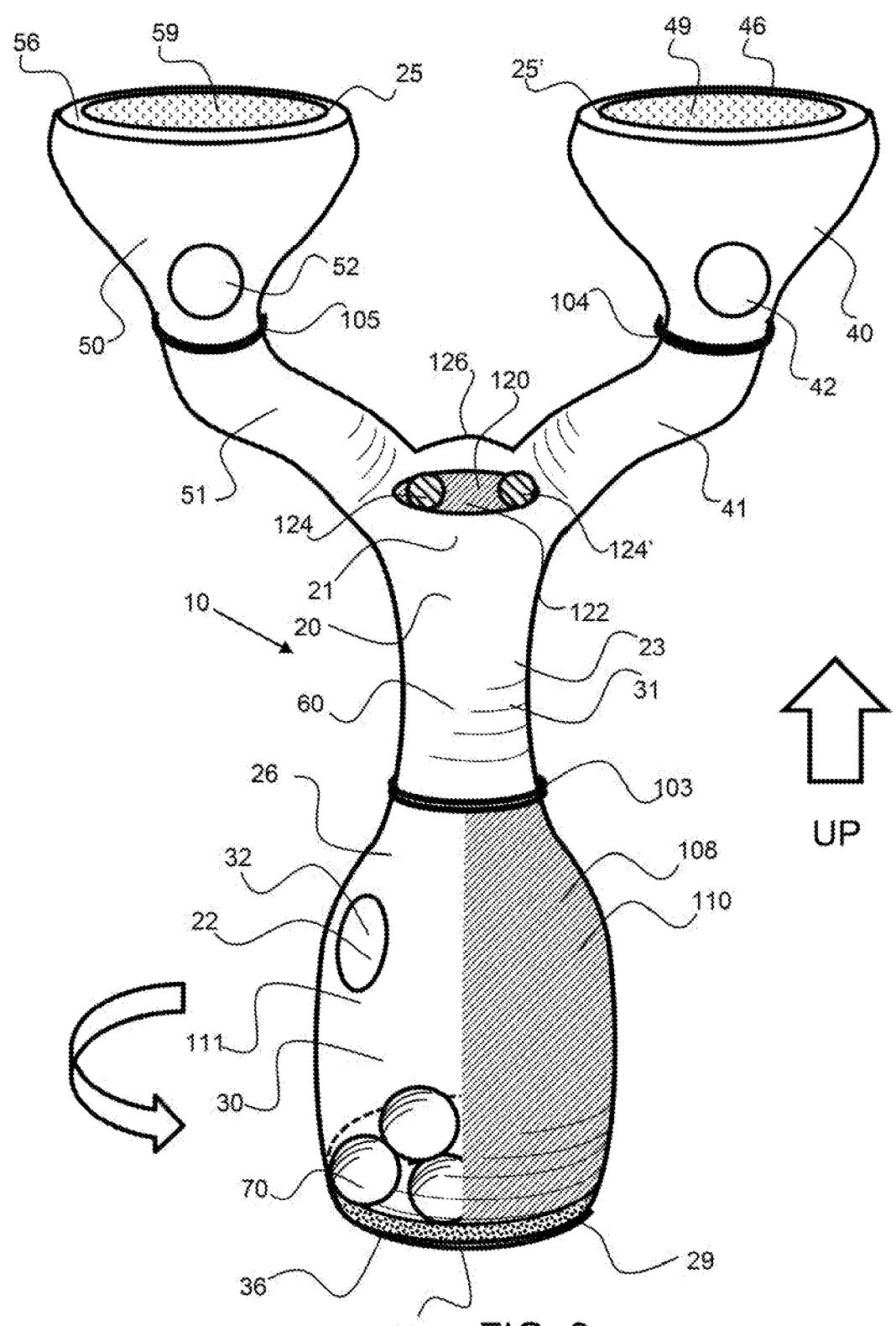

FIG. 6 shows the exemplary arithmetic educational tool shown in FIG. 5 resting on the base of the main chamber and the seven objects collected within the main chamber.

Figure 7:
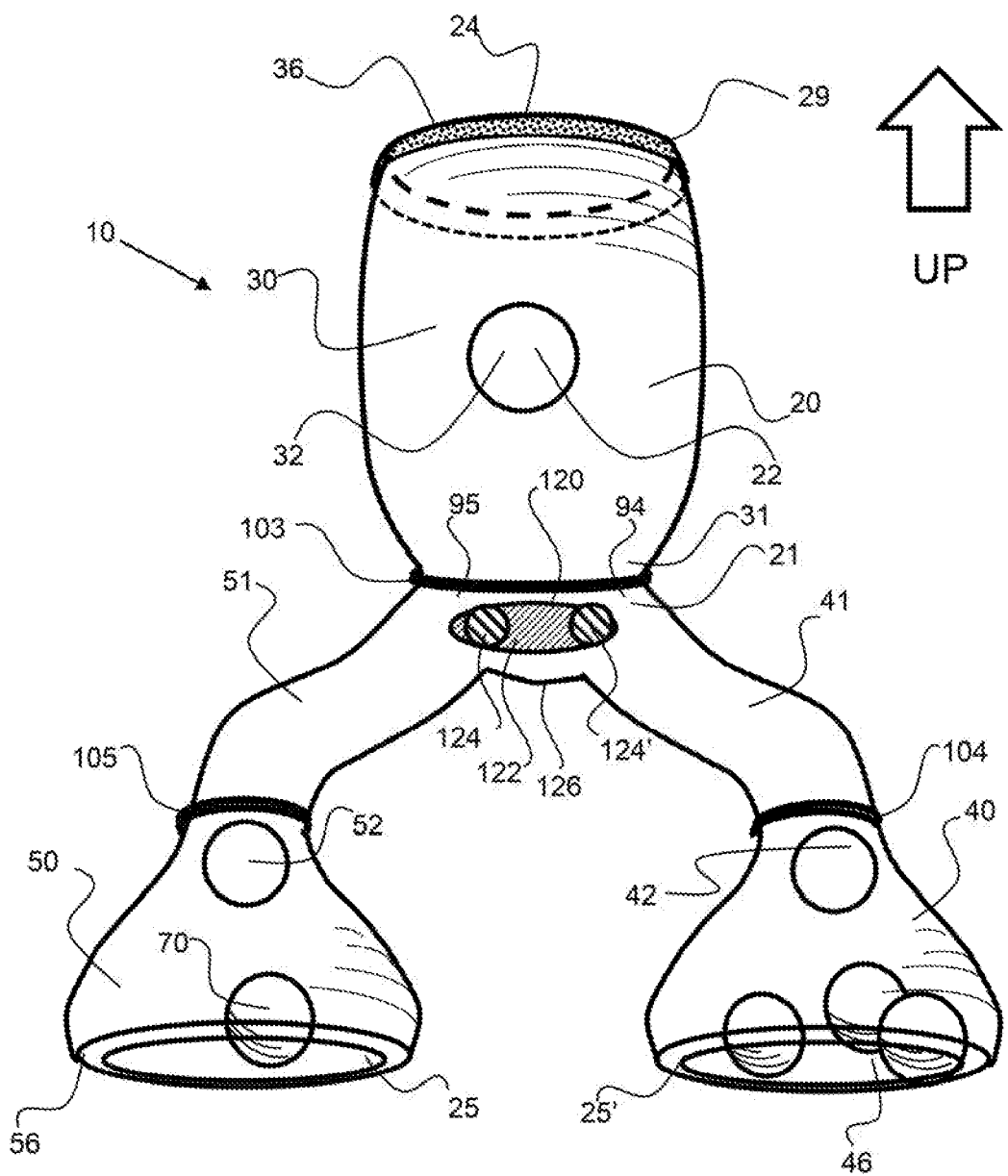

FIG. 7 shows an exemplary arithmetic educational tool comprising a bifurcated container with the bifurcated portion configured on the main chamber.

Figure 8:
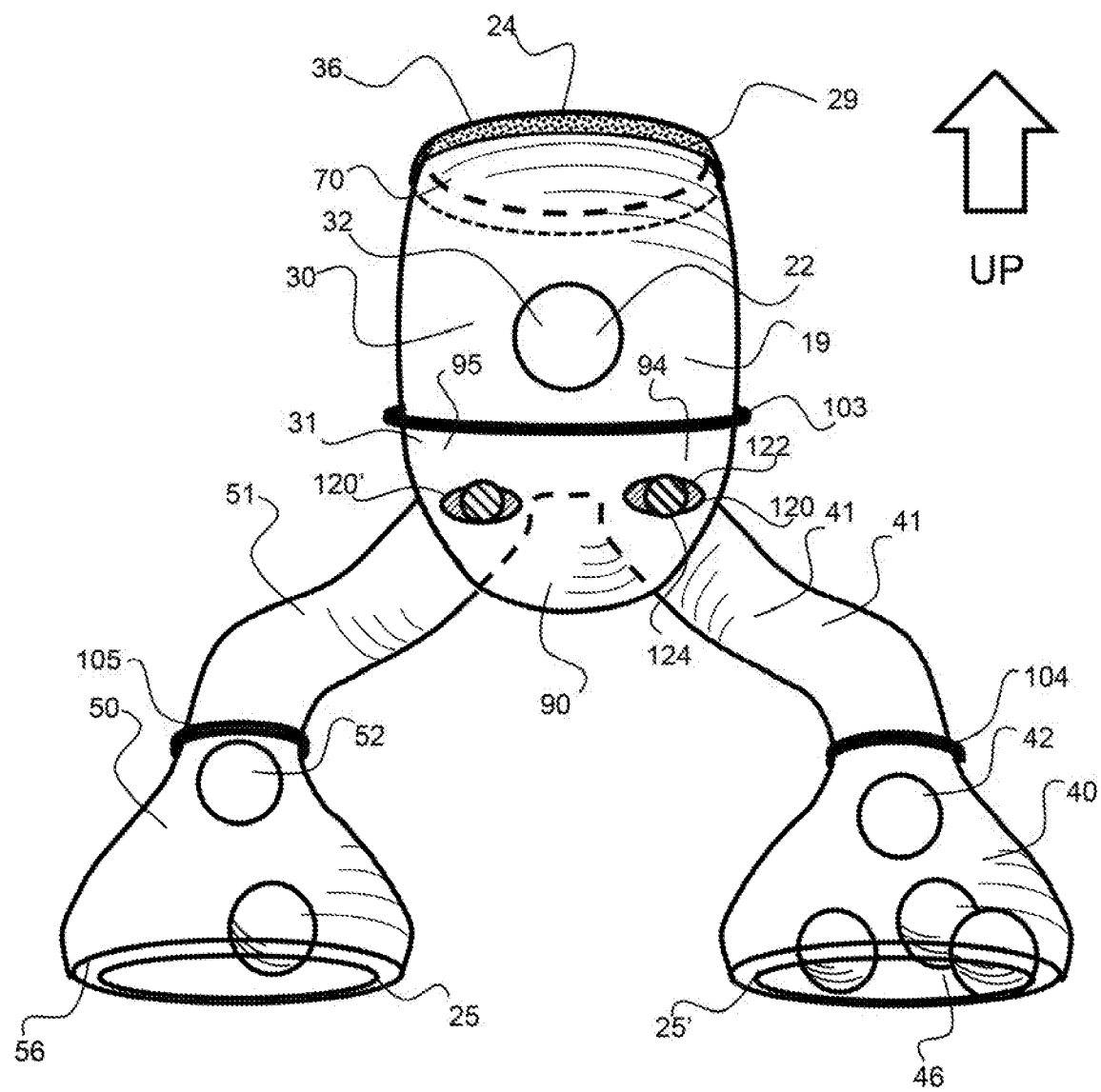

FIG. 8 shows an exemplary arithmetic educational tool comprising a bifurcated container having two chambers extending from the main chamber.

Figure 9:
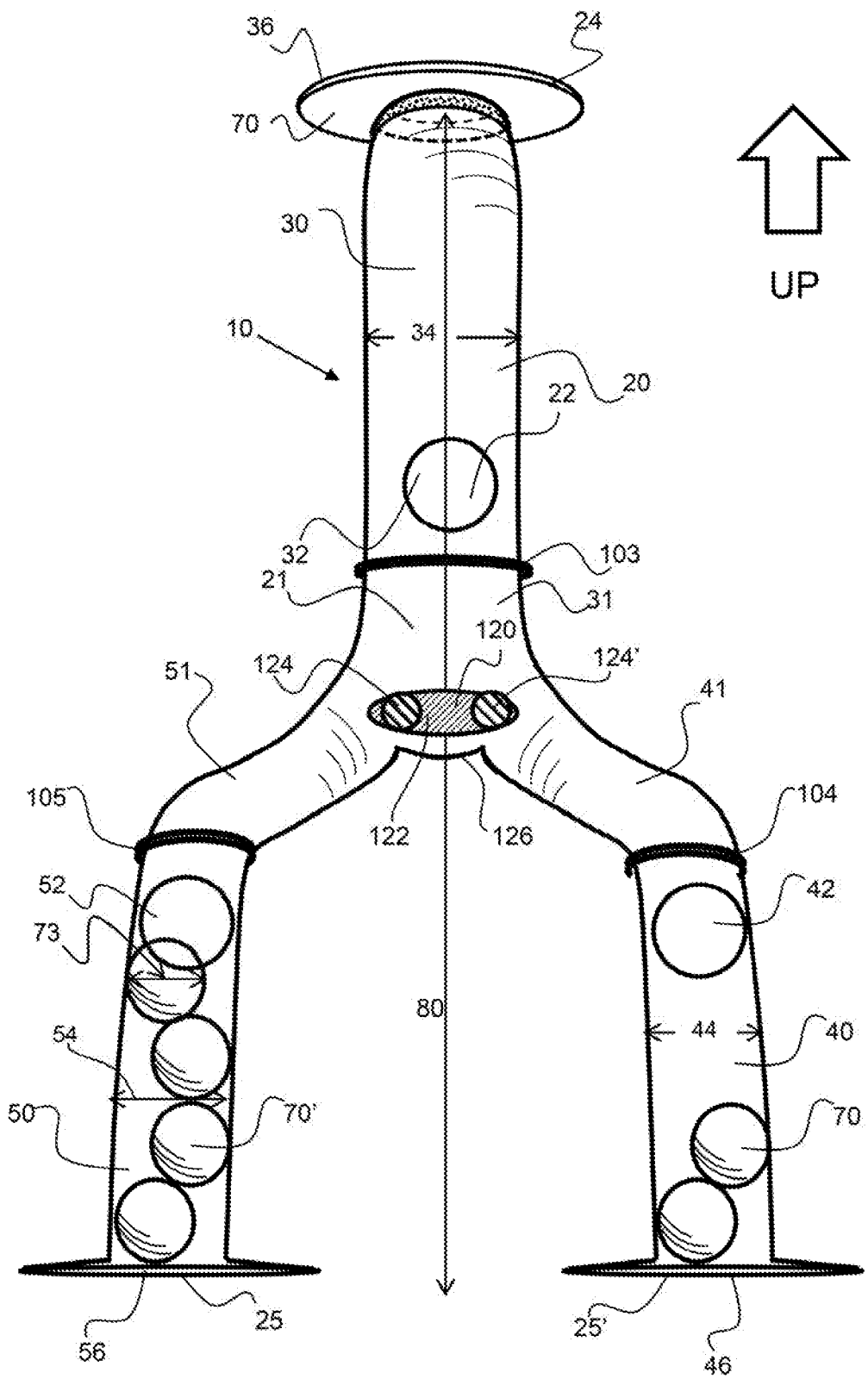

FIG. 9 shows an exemplary arithmetic educational tool comprising chambers that are large enough to fit a single object along the vertical axis therein.

Figure 10:
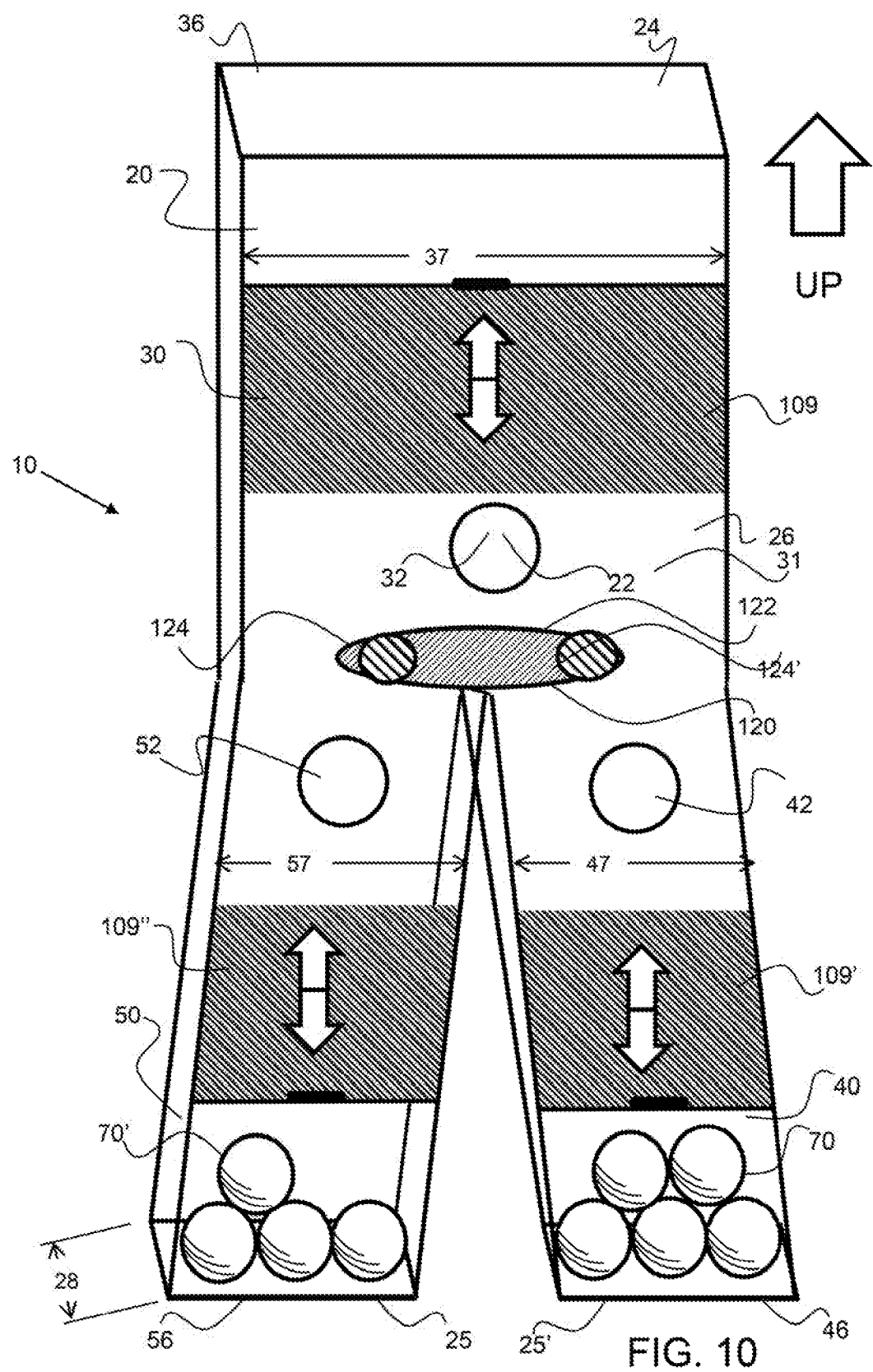

FIG. 10 shows an exemplary arithmetic educational tool comprising chambers with a depth that are just large enough to accommodate one object but not larger than the diameter of two objects.

Figure 11:
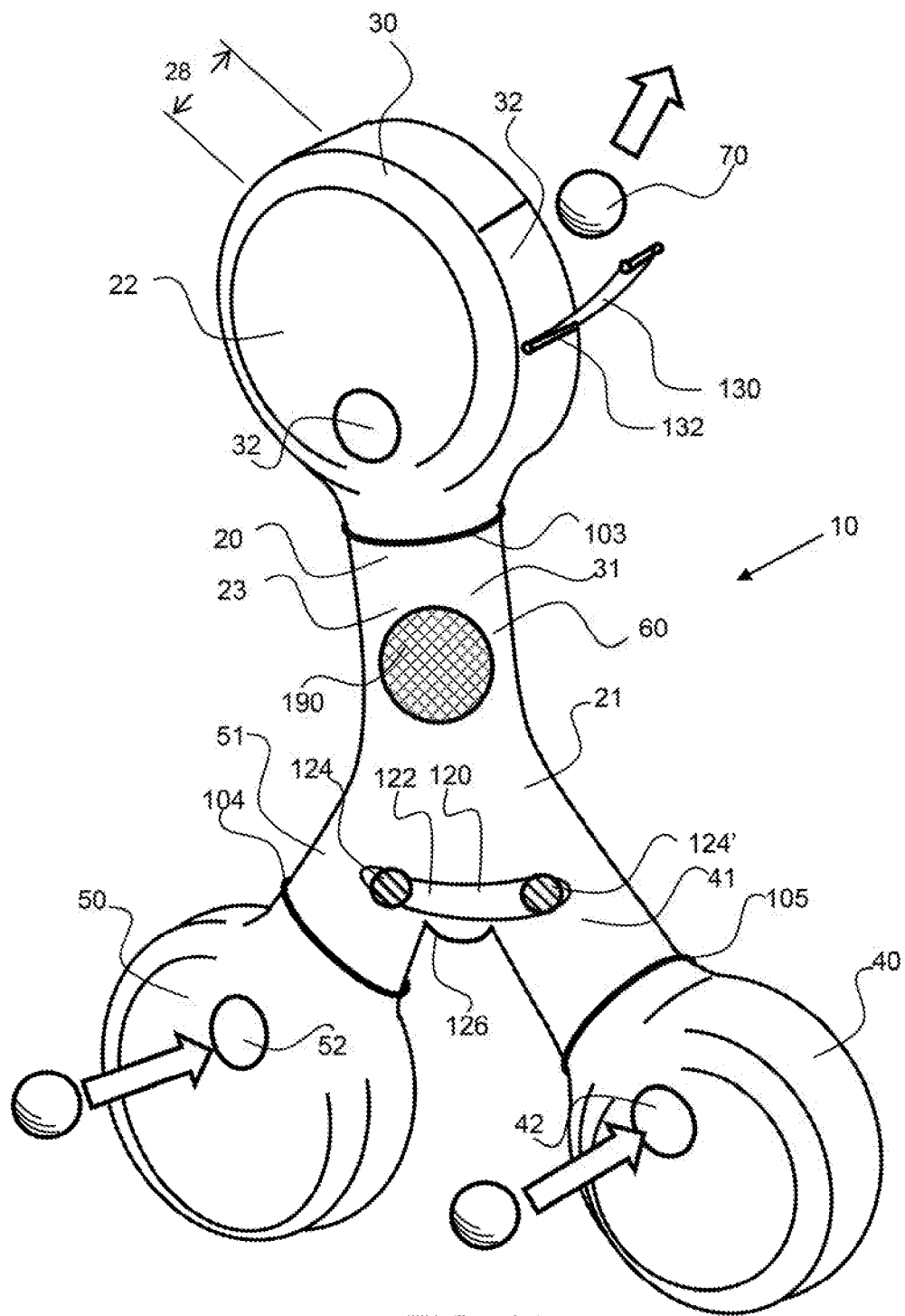

FIG. 11 shows an exemplary arithmetic education tool comprising disc shaped chambers having parallel sides and a circular perimeter.

Figure 12:
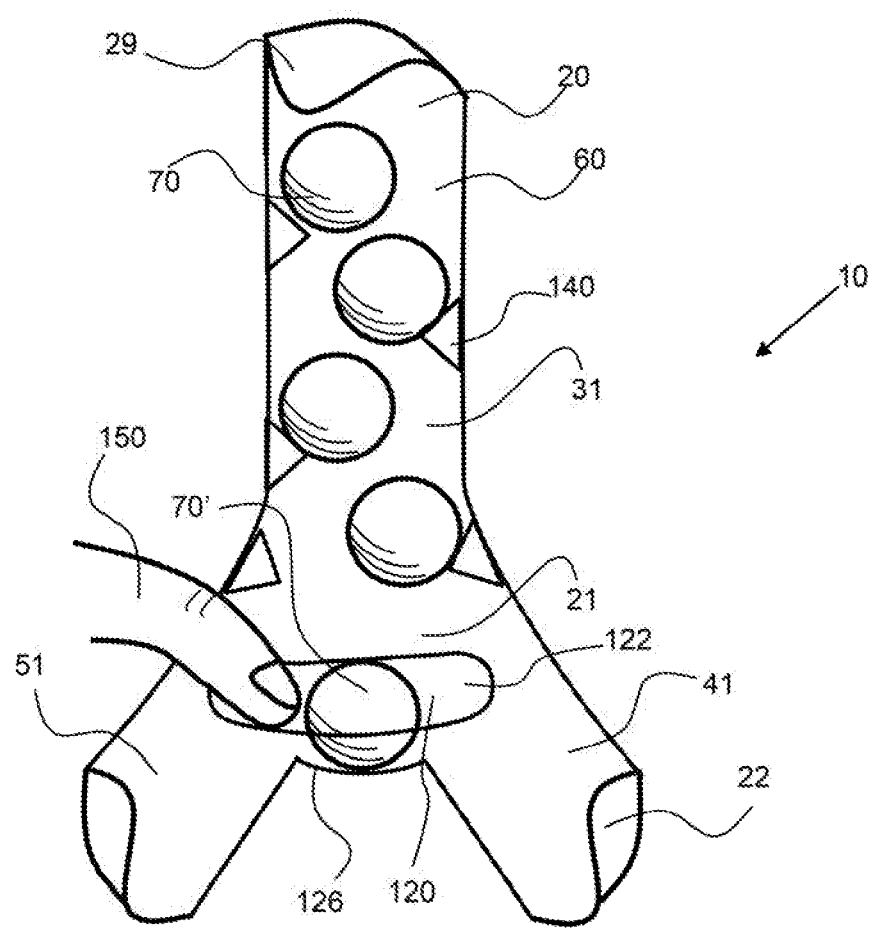

FIG. 12 shows a portion of an exemplary arithmetic education tool comprising protrusion extending into the interior volume, such as protruding in from the interior surface to deflect the object as they move from chamber to chamber.

Figure 13:
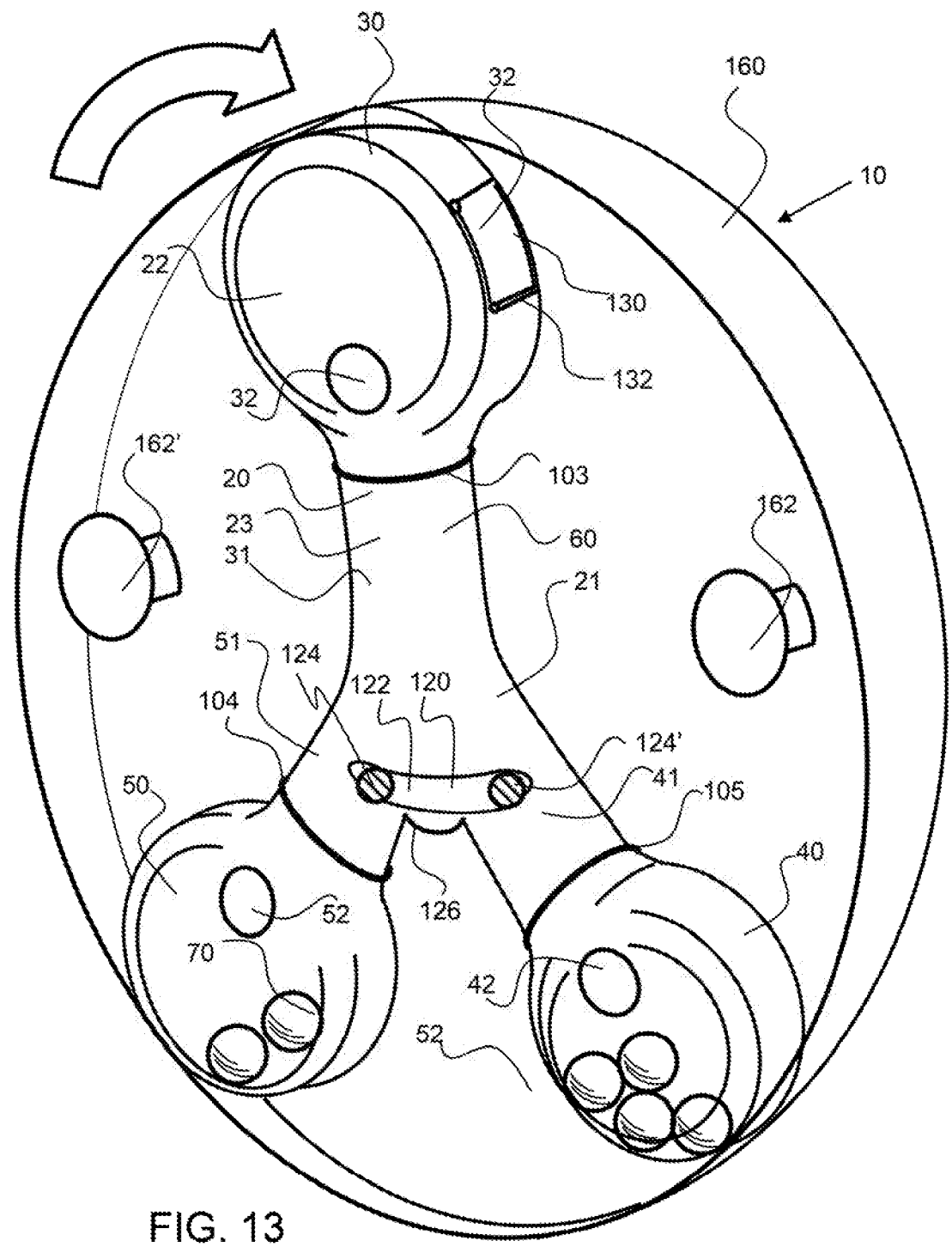

FIG. 13 shows an exemplary arithmetic tool configured in an enclosure having handles to allow a user to spin the enclosure to place the tool in different orientations.

Figure 14:
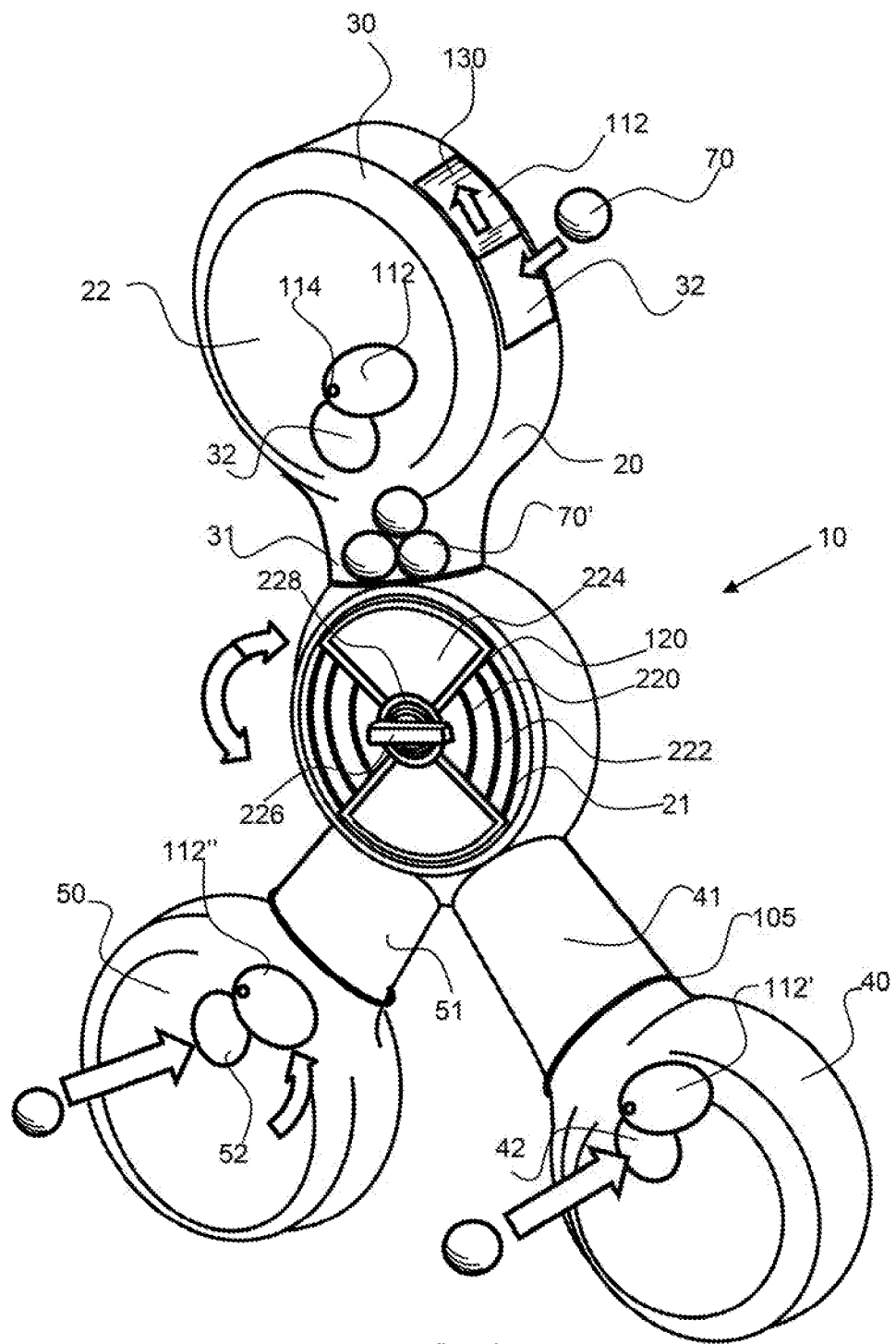

FIG. 14 shows an exemplary arithmetic education tool comprising a count-control wheel having a receiving section and blocking section to control the movement of objects through the bifurcated portion of the container and a insertion aperture covers configured to slide open to expose insertion apertures.

Figure 15:
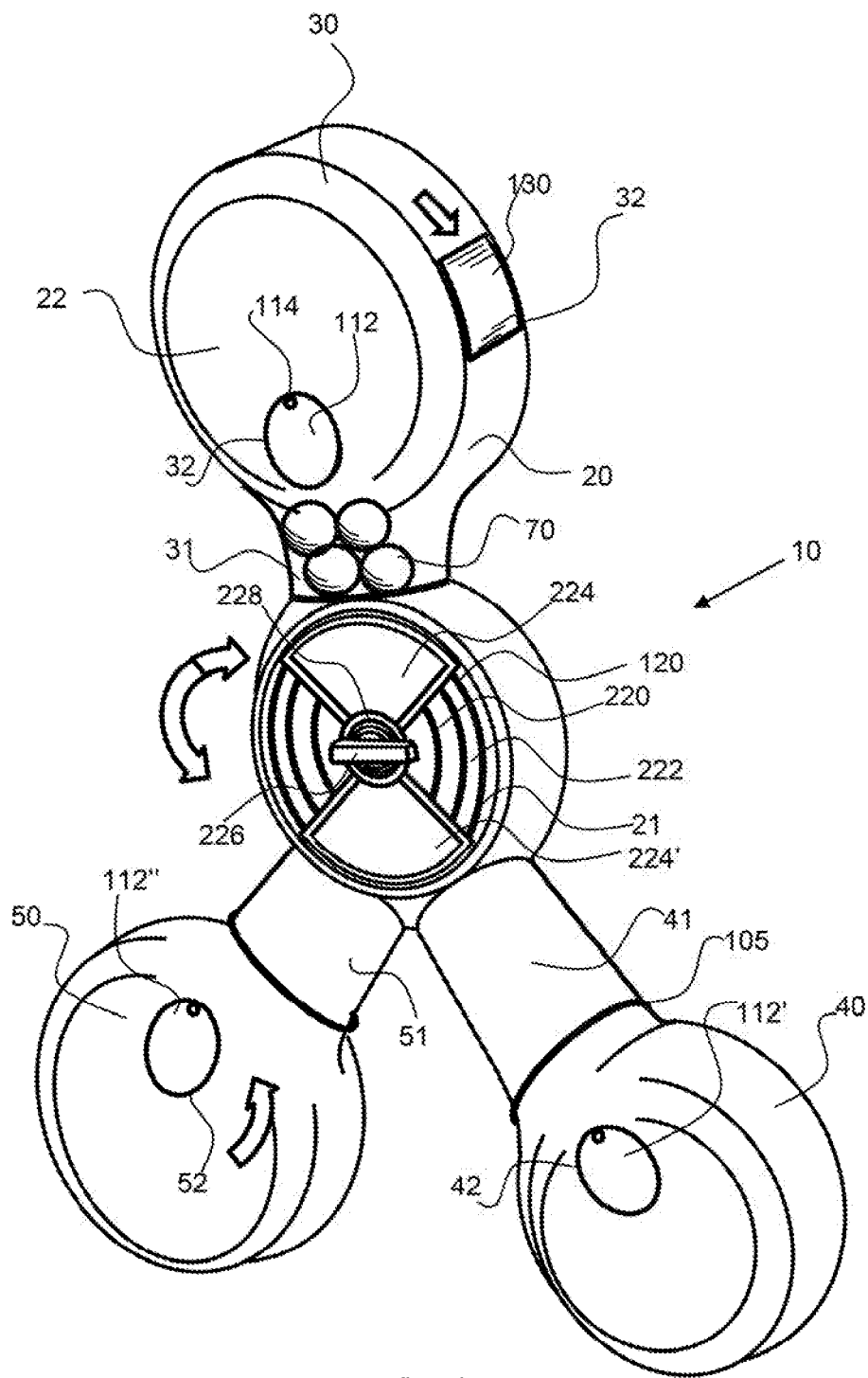

FIG. 15 shows the exemplary arithmetic education tool of FIG. 14 with four objects, balls, configured in the main chamber and the count-control wheel configured with the blocking section over the main chamber conduit to prevent the balls from entering the count-control wheel.

Figure 16:
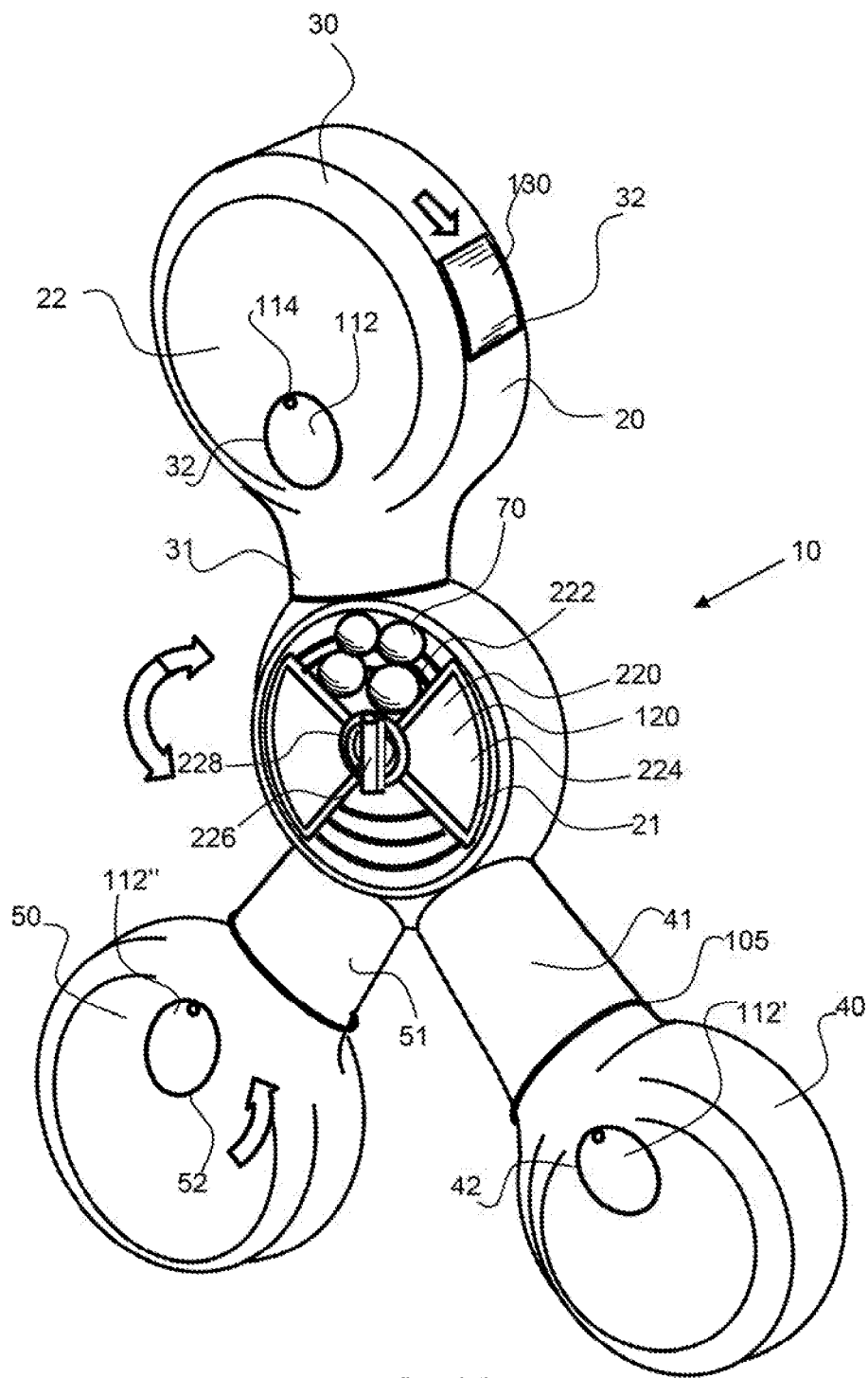
Figure 17:
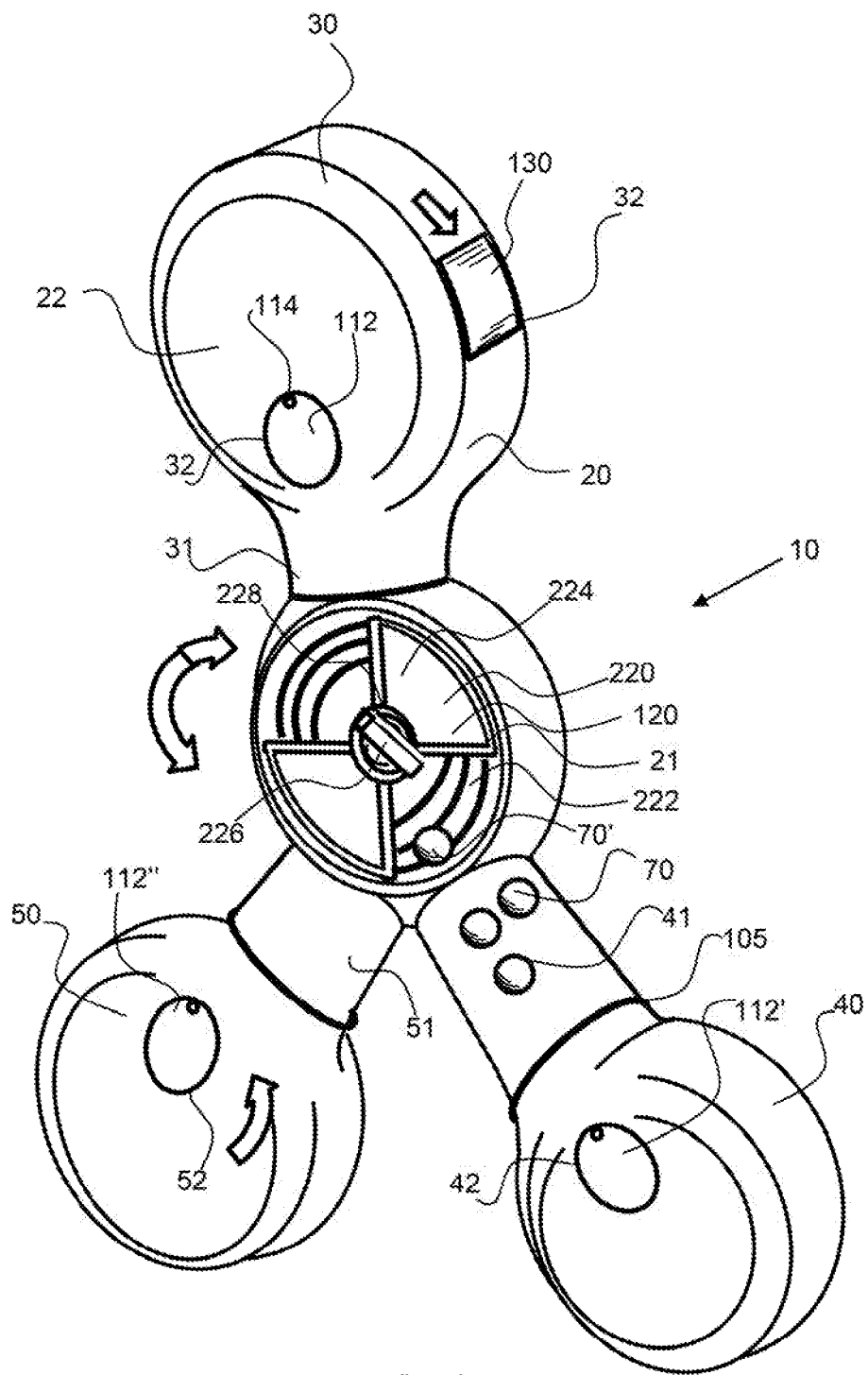

FIG. 16 shows the exemplary arithmetic education tool of FIG. 5 with the count-control wheel spun to align the receiving section with the main chamber conduit to allow the objects to enter into the receiving section, FIG. 17 shows the exemplary arithmetic education tool of FIG. 16, with the count-control wheel spun by the dial to align the receiving section containing the object with the first chamber to allow three of the objects to enter into the first chamber.

Figure 18:
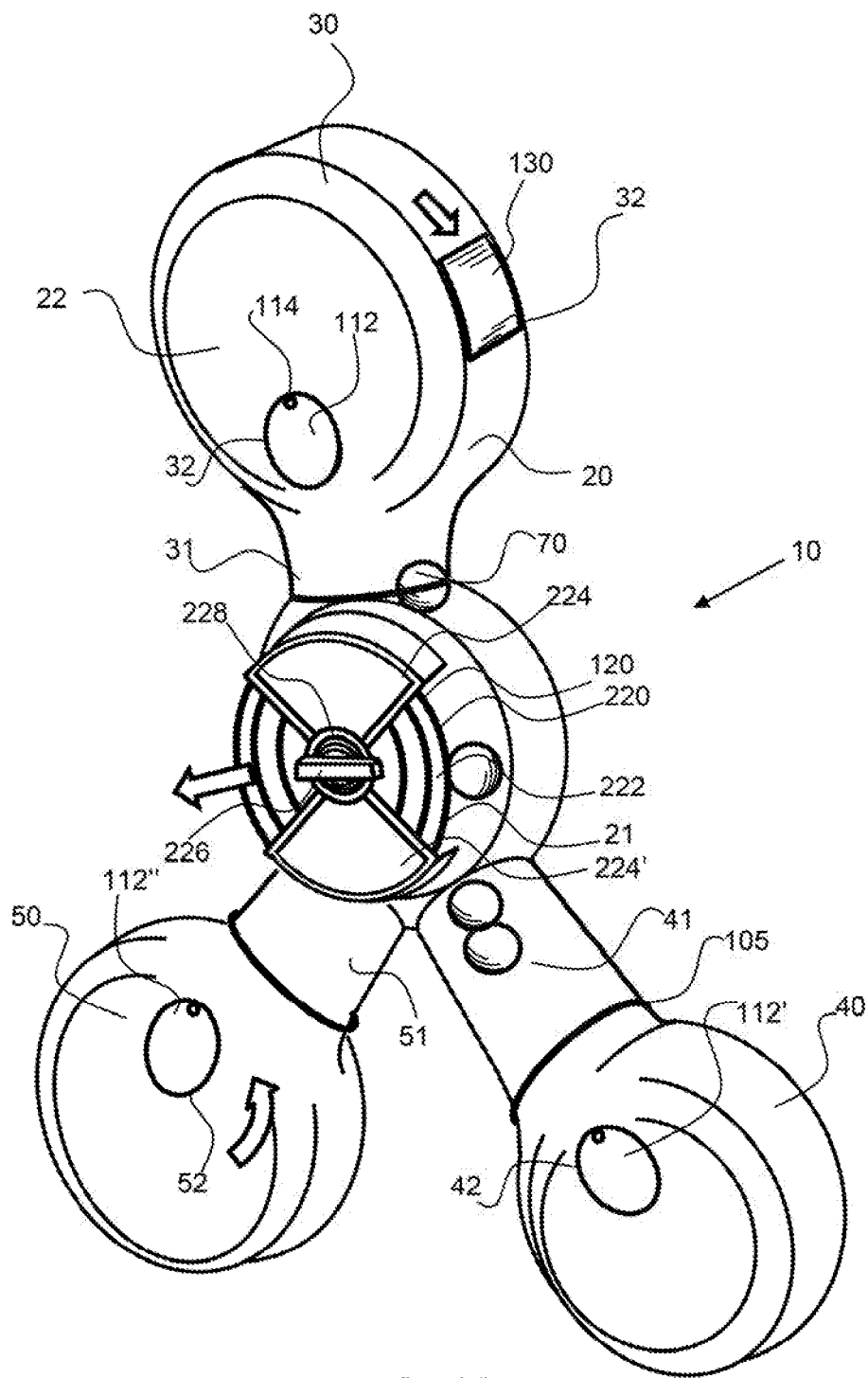

FIG. 18 shows the exemplary arithmetic education tool of FIG. 15, with the count-control wheel pulled out from the container to allow the objects to pass freely through the bifurcated portion from one chamber to another.

Figure 19:
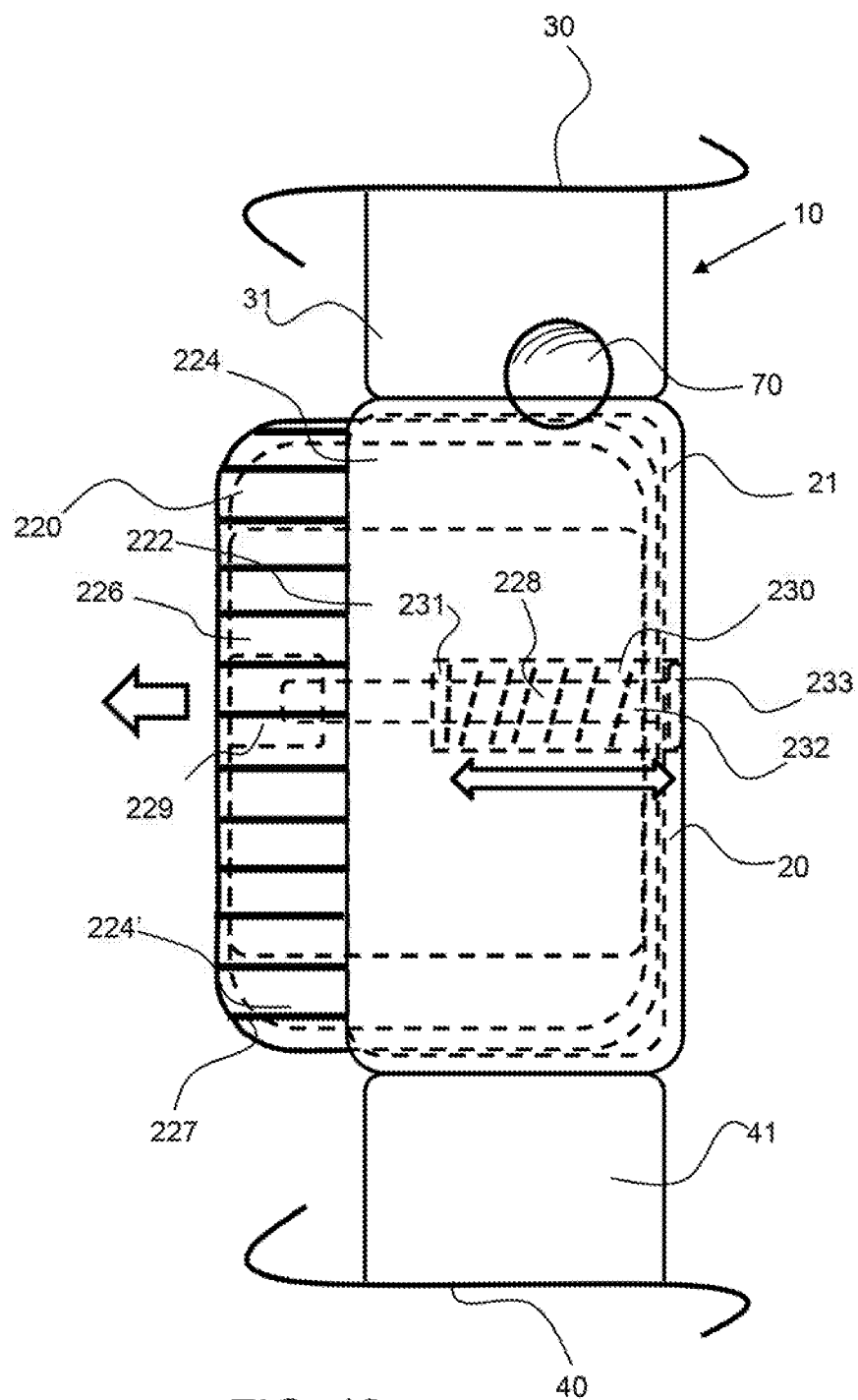

FIG. 19 shows a side view of a portion an exemplary arithmetic educational tool, with a count-control wheel configured in a bifurcated portion and blocking objects from passing from one chamber to another.

Figure 20:
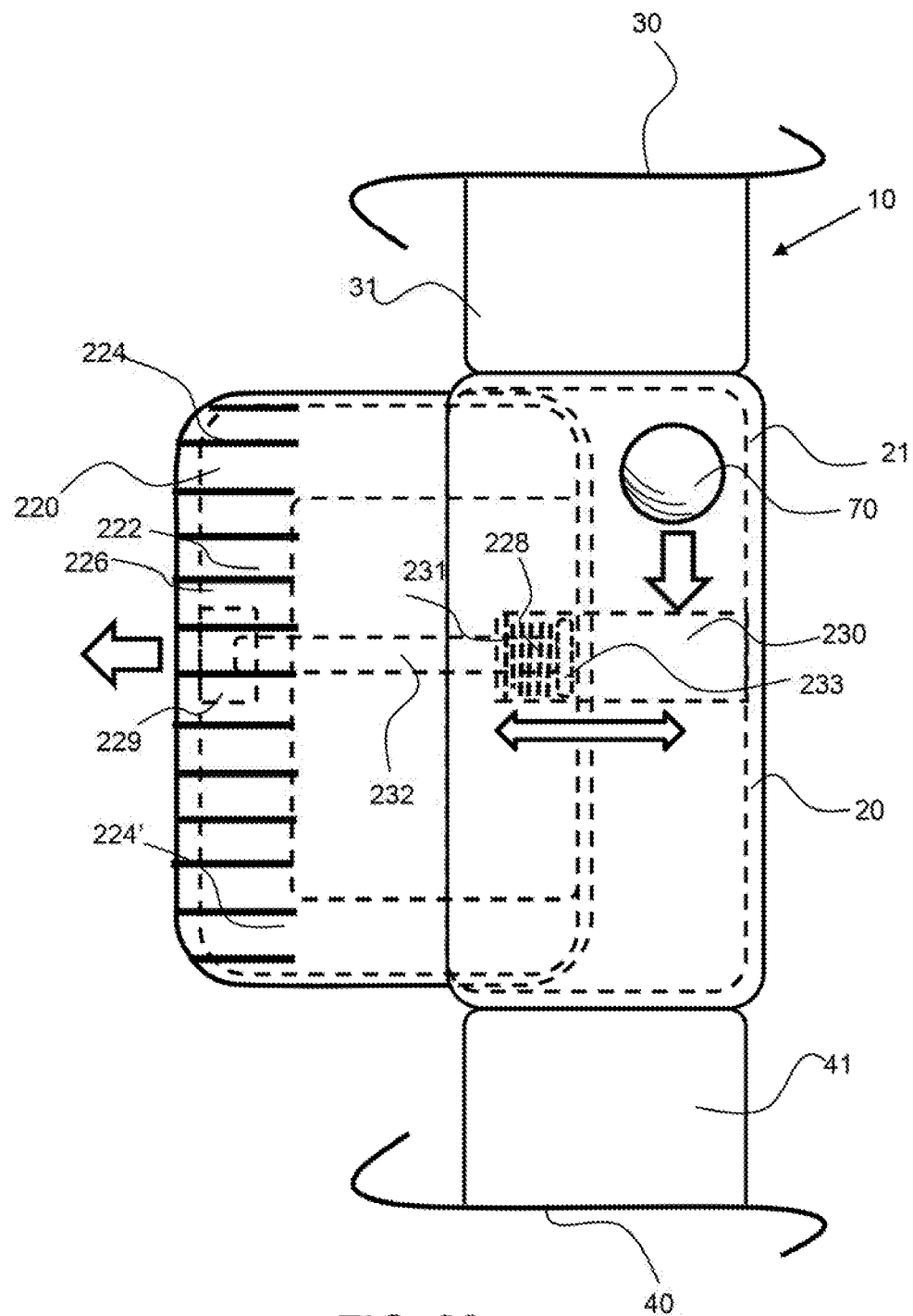

FIG. 20 shows a side view of the exemplary arithmetic educational tool shown in FIG. 19, with the count-control wheel pulled out from the container to allow the objects to pass freely between the count-control wheel and the container from one chamber to another.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As, used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. In addition, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

Bifurcated, as used herein in relationship to the container, is defined as a container having a main chamber and at least two branches that lead to extended chambers.

Cap, as used herein, refers to any type of cover or closure for an aperture in the container, including, the insertion apertures for the insertion of objects, and a base aperture, and may comprise a plug that is inserted into an aperture, a cover that is fit over the base end, a screw on type cover wherein the cover has threads that match with threads on the container, a sliding cover, wherein the cover is configured to slide within a slot of the container, and the like.

Transparent, as used herein with reference to the container, includes translucent exterior walls of the container that enable counting of objects within the container.

As shown in FIG. 1, an exemplary arithmetic educational tool 10 comprises a bifurcated container 20 having a main chamber 30 and two extended chambers 40, 50. The container has an interior volume 22 for receiving, objects 70-70''' therein. Object 70''' is a different color than the other objects and this may be used to represent the number ten. It is to be understood that a ball of a second color may represent 100. The objects may be inserted into the container through insertion apertures, 32, 42, or 52. The bifurcated container is standing upright and resting on the base 24 of the main chamber. The first chamber 40 and the second chamber 50 each have a base 46, 56 and a cap configured thereon, 49, 59, respectively. The bifurcated container has a bifurcated portion 21, wherein the main chamber branches into the two extended chambers. The main chamber may be reduced in cross sectional area as it extends to the bifurcated portion and this reduced cross sectional area portion of the main chamber, or connecting portion 60, may have any suitable length. The connecting portion may add to the visual effect of the objects moving from the main chamber to the two extended chambers, and vice versa. The cross-sectional area of the connecting portion may be about 20% less, about 30% less, about 50% less than the cross-sectional area of the main chamber. The container may comprise an exterior wall 23, defining the interior volume of the container that is contiguous, or a one-piece unit. As shown, the bifurcated container 20 is sitting upright on a first end 24, or base of the main chamber, and the two extended chambers extend to a second, end 25. A cap 39 is configured on the main chamber to allow easy removal and addition of objects into the container. The base 29 has a plurality of indentations 75 that are configured to hold the objects in a fixed position for easy counting. Also shown in FIG. are connectors 103, 104, 105, for enabling the chambers to rotate from a position where the contents can be seen through a transparent/translucent exterior wall, to a position where the contents are hidden. A back side of the chamber may be opaque, and thereby hide contents within the chamber from view when oriented toward the user.

Also shown in FIG. 1 and throughout the figures are count-control features 120 that are configured in the bifurcated portion 21 of the container and proximal the opening to the two extended chambers. The exemplary count-control feature comprises a count-aperture 122 in the container exterior wall 23 to allow a user to control the number of objects, such as balls, that move from the main chamber 30 into the extended chambers 40, 50. A user may insert a finger into the count-aperture 122 after turning the arithmetic educational tool 10 over to block some of the balls from moving into one of the extended chambers. As shown, the exemplary count-control feature 120 may comprise one or two count-plungers 124, 124' that extend into the interior of the container to block objects. The count-plunger may be pushed in or pulled out to control object movement into an extended chamber. A count plunger may be spring loaded to retract from an interior of the container for example. In addition, a bifurcated container may contain a landing nest 126 between the first and second chamber in the bifurcation between the chambers. The landing nest may be configured to intercept the objects before they move into the first or second chamber conduits. This intercepting landing nest may allow a user more control to manipulate which chamber the objects move into. An exemplary landing nest is concave in shape to secure a spherical object therein. As shown in detail in FIG. 12, a bifurcated container as shown in any of the figures may have protrusions 140 extend inward into the interior volume to deflect the objects as they move within the container, FIG. 2 shows the exemplary arithmetic educational tool 10 shown in FIG. 1 with the four objects 70-70''' placed within the interior volume 22 of the main chamber and the cap 59 of the second chamber 50 removed from the second chamber base aperture 59. The main chamber 30 is standing upright, on the main chamber base 36 and the bifurcated container is self-standing. The main chamber 30 of the bifurcated container 20 is therefore in a declined orientation with respect to the two extended chambers 40, 50. The objects 70 are therefore resting within the main chamber within the indentations 75 in a fixed position. The first chamber 40 is rotated by the collar 104 to expose the opaque side, of the exterior wall of the first chamber to the user. The contents within the first chamber are thereby hidden from view.

FIG. 3 shows the exemplary arithmetic educational tool 10 shown in FIG. 2 with the main chamber 30 in an elevated, or up, orientation with respect to the two extended chambers 40, 50, and the four objects 70-70''' are retained in the two extended chambers. The objects divided randomly between the first and second chambers. This change in orientation of the bifurcated container, from FIG. 2 to FIG. 3 can be used to demonstrate decomposition or subtraction from a larger number to two smaller numbers. The main chamber base cap 39 is removed and has threads 77 for securing to the container, having mating threads 77'.

FIG. 4 shows an exemplary arithmetic educational tool 10 comprising a bifurcated container 10 having a main chamber 30, a first, chamber 40, a second chamber 50 and a bifurcated portion 21. The bifurcated container has a length 37 from a first end 24 to a second end 25, or the most extended portion of either of the two extended chambers from the base 36 of the main chamber. The main chamber has a length 35 from the base 36 to the bifurcated portion 21, or where the main chamber branches into the two extended chambers. A portion of the length of the main chamber may be a connection portion 60, or a reduced cross-sectional area portion of the main chamber. A connecting portion may be a separate part that is coupled to each of the chambers by the collars, 103, 104, and 105. The main chamber has a diameter 34 and an insertion aperture 32 having a diameter 33. Each of the extended chambers 40, 50, has an insertion aperture 42, 52 having a diameter 43, 53, respectively. The insertion aperture diameters are larger than the diameter 73 of the objects 70, spheres as shown. A length axis 80 extends substantially perpendicularly from the center of the base of the main chamber and up between the two extended chambers. The two extended chambers are offset from each other by an offset distance 68. In an exemplary embodiment, the two extended chambers symmetrically extend from the main chamber and from the length axis. Each of the extended chambers has a length 45, 55 extending from the bifurcated portion to the base 46, 56 of each extended chamber, respectively. Each extended chamber has a diameter 44, 54 at the base for the collection of objects, thereon. The chambers shown are flask shape, having a circular base that truncates to the bifurcated portion.

As shown in FIG. 5, an exemplary arithmetic educational tool 10 comprises a bifurcated container 20 that is resting on the first chamber base 46 and the second camber base 56, or the second end 25. The two extended chambers base ends are planar surfaces that are substantially parallel and aligned with each other, enabling the container to stand up-right on both base ends. In this embodiment, the base 36 of the main chamber is parallel with the base ends of the two extended chambers 46, 56 but offset by the length of the container 37. The length 37 of the container extends from the plane of the main chamber base to the plane of the two extended chamber base ends. The first chamber 40 comprises three objects 70 and the second chamber 50 comprises four objects 70' within the interior volume 22 of the container. The objects may be placed into the first and second chambers through the insertion apertures 42, 52, respectively to aid in the education of addition, or cumulating, whereby the student can count the objects as they are placed in the container. The interior base surface of the first chamber 84 and the interior base surface of the second chamber 85 may be sloped toward the front to cause the objects to, rest along the front of the container 26, or front face of the chambers to facilitate counting. The interior surface of the main chamber 83 may also be sloped towards the front of the container to facilitate counting. In another embodiment, the depth of the container is only, large enough to accommodate a single object and thereby causes the objects to stack in plane with each other.

FIG. 6 shows the exemplary arithmetic educational tool 10, shown in FIG. 5, resting on the base 36 of the main chamber 30, or first end 24, and partially rotated to expose the objects 70 therein. The teacher may have asked the student how many objects are in the main chamber before rotating the main chamber from the back side 108, or side having an opaque portion 110, to the front side 26, or translucent side or portion 111. The seven objects 70 collected within the main chamber are made visible to the student by the rotation from the back side to the front side, or from the opaque portion to the translucent portion of the chamber. The collar on the main chamber 103 that enables this rotation is an example of an obscuring feature. The re-orienting of the container from resting on the two extended chamber base ends to resting on the main chamber base 36 demonstrates addition in a physical and three-dimensional visual way. The objects move from the first and second chambers and collect in the main chamber to where they can be counted. Again, the inside surface, of the base of the main chamber may be sloped toward the front 26, to force the balls to stack along the front face to allow easy counting of the objects. In addition, the depth of the inside surface of the main chamber may be slightly larger than the diameter of the objects, thereby only allowing a single object to fit within the depth. This will again cause the objects to stack up vertically along the front face of the container for easy counting. The connecting portion or one side of the connecting portion may be opaque to obscure the objects moving between the chambers, thereby preventing the student from counting the objects as they move past the bifurcated portion into one of the chambers.

As shown in FIG. 7, the exemplary arithmetic educational tool 10 comprises a bifurcated container 20 with the bifurcated portion 21 extending directly from the main chamber 30. The openings to each of the extended chambers 94, 95, or branch openings, extend directly into the main chamber 30.

As shown in 8, an exemplary arithmetic educational tool 10 comprises a bifurcated container 20 having two extended chambers 40, 50 extending from the main chamber 30. A deflector 90 is configured on the interior surface 29 of the container and between the opening to the first chamber 94 and the opening to the second chamber 95. The deflector ensures that the objects will move into one of the first or second chambers and will not be resting in the main chamber when the container is moved from an orientation with the main chamber down to an orientation with the main chamber up.

As shown in FIG. 9, an exemplary arithmetic educational tool 10 comprises chambers that are large, enough to fit a single object along the vertical axis 80 therein. The diameter of the main, first and second chambers, 34, 44, and 54 respectively may be larger than the diameter of an object 73, but not larger than two objects, thereby forcing the objects to align vertically, or stack along the length of the chambers. This vertical alignment may facilitate counting of the objects as they move from the main chamber to the two extended chambers, and vice versa.

As shown in 10, an exemplary arithmetic educational tool 10 comprises chambers that are rectangular cross-sectional shape, having an interior depth 28 that is large enough to accommodate one object but not larger than the diameter of two objects. The objects will therefore stack within the chambers to facilitate counting. As shown in FIG. 10, there are five objects 70 in the first chamber 40 and four objects 70' in the second chamber 50. The main chamber has a larger width across the front face 37 than the two extended chambers width, 47, 57. The depth within the container is substantially uniform from the first end 24 to the second end 5. Also note that the base surfaces of the chambers are flat and planar to enable the container to be self-standing on the first 24 or second 25 ends. As shown in FIG. 10, slidable covers 109-109", an example of an obscuring feature, are configured to enable a teacher or user to hide the contents within the chambers. The slidable covers are configured to slide over the extended ends of the chambers and obscure contents therein from view. The slidable cover may be made out of an opaque material that does not allow viewing therethrough. A slidable cover is an example of an obscuring feature that enables a user to hide or obscure the contents of the chamber.)

FIG. 11 shows an exemplary arithmetic education tool 10 comprising disc shaped chambers having parallel sides and a circular perimeter. The exemplary arithmetic education tool also comprises a count-control feature 120 having a count-aperture 122 that a user could insert a finger into to manipulate and control the direction of objects moving therein. The count-control feature also comprises a pair of count plungers 124, 124' that can be depressed to prevent an object form moving into a chamber. A landing nest 126 is configured in the bifurcated portion 21 between the first chamber 40 and second chamber 50 and has a concave shape to retain an object therein. The exemplary arithmetic education tool also comprises a door 130 connected to the bifurcated container 20 by a hinge 132. The door can be easily opened for insertion or removal of the objects and then be snapped shut. A teacher, or student may use the apertures, 32, 42, or 52 for insertion of objects into the tool, to enable the students to count the number being inserted before the tool is used. The door 130 may be used primarily for removal of the object. The depth 28 of the disc shaped chambers is greater than a diameter of the object 70 but less than twice the diameter of the object, thereby causing the objects to stack within the chambers for easy counting. FIG. 11 also shows a magnetic material 190 coupled to the bifurcated container to enable the container to be detachably attached to a metallic surface including a chalk board.

FIG. 12 shows a portion of an exemplary anti uretic education tool 10 comprising protrusions 140 extending into the interior volume 22, such as protruding in from the interior surface 29 to deflect the objects 70 as they move from chamber to chamber. The protrusions are alternating from side to side to cause the object to bounce back and forth or to spiral around the interior as it moves within the conduit. The bifurcated portion 21 also comprises landing nest 126 between the first and second chamber conduits 41, 51 respectively. The landing nest is concave in shape to retain the spherical object 70. The count-control feature 120 is configured just above the landing nest and extend partially over the first and second chamber conduits, or the opening to the conduits. A user is inserting a finger 150 into the count-aperture 122 to, deflect the objects as desired.

FIG. 13 shows an exemplary arithmetic tool 10 configured in an enclosure 160 and the enclosure is configured to spin to allow the objects 70 therein to move from one chamber to another. The enclosure may'e mounted to enable the enclosure to spin freely and the enclosure has handles 162, 162' to allow a user to freely spin and stop the chamber in different orientations. The exemplary arithmetic tool may be adapted for use on a playground, wherein children can spin the enclosure and then count the number of balls in each of the chambers. The enclosure may open to allow an educator to take the arithmetic tool 10 out and change the number of objects, such as balls, therein. This may be useful in educating fact families. A teacher may change the number of balls in the exemplary arithmetic tool each day or week, for example, so children learn the fact families for a variety of numbers.

Referring now to FIGS. 14 to 18, an exemplary arithmetic education tool 10 may comprise a count-control wheel 200 having a receiving section 222 and blocking section 224 to control the movement of objects 70 through the bifurcated portion 21 of the bifurcated container 20. The count-control wheel 200 has a dial 226 that a user may manipulate to spin the count-control wheel to move the objects from one chamber to another in a controlled manner. A user may want to move only a certain number of objects from the main chamber 30 to a first chamber 40 and then move the remaining objects to the second chamber 50, for example. An exemplary count-control wheel may be configured with a spring element, or spring 228 as used herein, to cause the count-control wheel to return to a home position when not being manipulated. As shown in FIG. 14, a home position may configure the count-control wheel such that a blocking section is configured over each of the conduits of the chambers, thereby preventing any objects from entering the count-control wheel until it is manipulated. Also shown in FIGS. 14-17 are insertion covers 112 configured over insertion apertures, wherein the insertion covers are configured to slide to expose the insertion aperture. An insertion door 130, a type of insertion cover 112 configured over the outer perimeter of the main chamber and is configured to, slide along the outer perimeter to expose the main chamber insertion aperture 32. Objects 70 may then be inserted through the main chamber insertion aperture into the main chamber 30. Note that the insertion door 130 is contoured to match the radius of curvature of the outer perimeter of the main chamber. Also note that this type of sliding door may be configured on any of the chambers. As shown, the first and second extended chambers are configured with sliding insertion covers 112', 112", respectively. These insertion covers are coupled to the container by a pin 114 that allows the cover to slide to expose the insertion opening. Objects may be inserted or removed from the container through the insertion aperture 32 and by opening the insertion door 130.

As shown in FIG. 14, the count-control wheel is configured in a home position with a blocking section 224 aligned, at least partially, with each of the chamber conduits; thereby preventing objects from entering the count-control wheel. As shown, the count-control wheel contains two receiving sections 222 and two blocking sections 224. Note that any number of blocking and receiving sections may be configured on the count-control wheel however.

As shown in FIG. 15, the exemplary arithmetic education tool 10 of FIG. 14 now has four, objects 70, balls, configured in the main chamber 30 and the count-control wheel 200 configured with a first blocking section 224 over the main chamber conduit to prevent the balls from entering the count-control wheel. A second blocking section 224' is configured over the first chamber conduit 41 and second chamber conduit 51 to prevent objects from entering the count-control wheel.

As shown in FIG. 16, the exemplary arithmetic education tool 10 of FIG. 15 now has the count-control wheel 200 spun to align the receiving section 222 with the main chamber conduit 31 to allow the objects 70 to, enter into the receiving section. Note that the receiving section 222 may be sized to allow a single object or multiple objects to fit therein.

As shown in FIG. 17, the exemplary arithmetic education tool 10 of FIG. 16, now has the count-control wheel 200 spun by the dial 226 to align the receiving section 22 containing the object with the first chamber conduit 41 to allow three of the objects to enter into the first chamber 40. Note that the count-control wheel may be rotated counter clockwise to align the receiving chamber with the second extended conduit 51 to deliver the last of the four objects to the second chamber 50.

As shown in FIG. FIG. 18 the count-control wheel 220 is pulled out from the container to allow the objects 70 to pass freely through the bifurcated portion 21 from the main chamber 30 to the first extended chamber 40. The blocking section 224 is aligned, with the main chamber conduit 31 and pulling the count-control feature out allows the balls to roll freely through the bifurcated portion 21. The spring 228 may be compressed as the count-control wheel is pulled outward and thereby cause the count-control wheel to be automatically pulled back to the container upon release. A user may tilt the container to have some of the objects move freely from the main chamber to the first extended chamber after moving one or more of the objects to the second extended, chamber, for example. Also, a user may turn the arithmetic education tool upside down and pull the count-control wheel out to return all the object to the main container after demonstrating one math example.

Referring now to FIGS. 19 and 20, an exemplary count-control wheel 220 may block objects 70 from passing through the bifurcated portion 21 when the blocking section 224 is aligned with a main chamber 30 or main chamber conduit 31, as shown in FIG. 19. However, a count-control wheel may be retained to the bifurcated container 20 by a retainer 232, such as a bolt or screw. The retainer may be inserted through the back of the container and may extend into a retainer conduit 230, having a conduit stop 231 to prevent the retainer head 233 from passing through the retainer conduit. A threaded end of the retainer may be coupled to the retainer coupler 229 of the count-control wheel 220. A return spring 228 may extend within the retainer conduit and may be a coiled spring that extends around the retainer, whereby the spring is restrained on one end, by the conduit stop 231 and on the other end by the retainer head 233. In this, way, the retainer can move back and forth within the retainer conduit, as depicted by the double arrow in FIG. 19. As shown in FIG. 20, the count-control wheel is pulled outward from the bifurcated container 20 and the return spring 228 is compressed. The object 70 can now freely pass through the bifurcated portion and around the retainer conduit 230. When the count-control wheel is released, the compressed spring will expand or elongate from the compresses state to pull the count-control wheel back to the container, such as into the aperture for receiving the count-control wheel, which may be a circular shaped aperture, as shown. The dial 226 for turning and manipulating the count-control wheel is a portion of the outer perimeter of the count-control wheel that extends out from the bifurcated container 20 and may have ribs or an irregular surface 227, as depicted by the bold lines on the portion of the count-control wheel extending out from the container in FIG. 19. The ribs may help a user manipulate the count-control wheel to rotate it and also to pull it out from the container.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. An arithmetic educational tool comprising:
 a) a bifurcated container comprising:
  i) a first end;
  ii) an interior volume;
  iii) an exterior wall;
  iv) an insertion aperture opening through said exterior wall;
  v) a main chamber configured proximal said first end;
  vi) a first chamber coupled with and extending from said main chamber;
  vii) a second chamber coupled with and extending from said main chamber;
  viii) a bifurcated portion wherein the first and second chambers are coupled to each other and the main chamber at the bifurcated portion;
  ix) a plurality of objects that are configured to fit through the insertion aperture and into the interior volume of the container; whereby the plurality of objects are configured to move from the main chamber to the bifurcated portion and subsequently into the first chamber or the second chamber;
  x) a count-control feature configured in the bifurcated portion of the bifurcated container and comprising a count-control wheel comprising: a receiving section for receiving said plurality of objects therein; a blocking section configured to prevent said plurality of objects from entering into the count-control wheel;
 wherein the count-control wheel is configured to rotate to align the receiving section with the main chamber, the first chamber and the second chamber;
 wherein said plurality of objects are configured to move from the main chamber to the first and the second chamber through the count-control wheel.

2. The arithmetic educational tool of claim 1, wherein each of the chambers has a transparent front surface to enable counting of objects therethrough.

3. The arithmetic educational tool of claim 1, wherein the count-control wheel comprises a dial that enables a user to rotate the count-control wheel.

4. The arithmetic educational tool of claim 1, wherein the count-control wheel comprises a spring to move the count-control wheel to a home position.

5. The arithmetic educational tool of claim 4, wherein the home position configures a first blocking section over a main chamber conduit of a main chamber.

6. The arithmetic educational tool of claim 5, wherein the home position configures a second blocking section over a first chamber conduit of the first chamber.

7. The arithmetic educational tool of claim 6, wherein the home position configures the second blocking section over a second chamber conduit of the second chamber.

8. The arithmetic educational tool of claim 1, wherein the count-control wheel is retained to the bifurcated container by a retainer and a spring and wherein said spring is configured between the count-control wheel and the retainer; whereby the count-control wheel is configured to be pulled outward from the container to allow the plurality of objects to pass freely through the bifurcated portion.

9. The arithmetic educational tool of claim 1, comprising an insertion cover configured over the insertion aperture.

10. The arithmetic educational tool of claim 9, wherein the insertion cover is configured to slide open to expose the insertion aperture.

11. The arithmetic educational tool of claim 10, wherein the insertion cover is coupled to the container by a pin that enables the insertion cover to slide open to expose the insertion aperture.

12. The arithmetic educational tool of claim 1, wherein the main chamber, the first chamber and the second chamber are disc shaped having parallel sides and a circular outer perimeter.

13. The arithmetic educational tool of claim 12, wherein the insertion aperture is configured in the circular outer perimeter of the main chamber, and wherein an insertion cover is configured over the insertion aperture.

14. The arithmetic educational tool of claim 13, wherein the insertion cover is configured to slide along the circular outer perimeter of the main chamber to expose the insertion aperture.

15. The arithmetic educational tool of claim 1, comprising a magnetic material coupled to the bifurcated container.

16. The arithmetic educational tool of claim 1, wherein the main chamber has a flat base at the first end of the container and wherein the container is self-standing on said flat base.

17. The arithmetic educational tool of claim 16, wherein both of the first and second chambers have a flat base that are substantially parallel and wherein the container is self-standing on said flat base of the first and second chambers.

18. The arithmetic educational tool of claim 1, wherein at least one of the main chamber, the first extended chamber or second extended chamber is configured to rotate.

19. The arithmetic educational tool of claim 1, wherein a plurality of objects are spheres that are configured to roll freely within the interior volume of the container.

20. The arithmetic educational tool of claim 1, wherein at least one of the plurality of objects is a different color than the remaining plurality of objects to indicate a base value of at least 10.

* * * * *